US008971179B2

(12) United States Patent
Nakamura et al.

(10) Patent No.: US 8,971,179 B2
(45) Date of Patent: *Mar. 3, 2015

(54) COMMUNICATION MANAGEMENT APPARATUS, COMMUNICATION NODE, AND DATA COMMUNICATION METHOD

(71) Applicant: Mitsubishi Electric Corporation, Chiyoda-ku, Tokyo (JP)

(72) Inventors: Masato Nakamura, Tokyo (JP); Tatsumi Yabusaki, Aichi (JP); Tomitsugu Sugimoto, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 13/761,505

(22) Filed: Feb. 7, 2013

(65) Prior Publication Data

US 2013/0148496 A1 Jun. 13, 2013

Related U.S. Application Data

(62) Division of application No. 13/377,397, filed as application No. PCT/JP2009/060800 on Jun. 12, 2009, now Pat. No. 8,842,521.

(51) Int. Cl.
*H04J 1/16* (2006.01)
*H04L 12/42* (2006.01)
(Continued)

(52) U.S. Cl.
CPC .......... *H04L 12/437* (2013.01); *H04L 12/4035* (2013.01); *H04L 12/433* (2013.01); *H04L 41/0672* (2013.01)
USPC .......................... 370/222; 370/450; 709/230

(58) Field of Classification Search
CPC .... H04L 12/2697; H04L 12/433; H04L 43/50
See application file for complete search history.

(56) References Cited

U.S. PATENT DOCUMENTS

2009/0073874 A1 3/2009 Maruyoshi et al.

FOREIGN PATENT DOCUMENTS

JP 2000278295 A 10/2000
JP 2001-156801 A 6/2001
(Continued)

OTHER PUBLICATIONS

Office Action(Non-final) dated Feb. 3, 2014, U.S. Appl. No. 13/377,397.
International Search Report, PCT/JP2009/060800, Jul. 14, 2009.

*Primary Examiner* — Melanie Jagannathan
(74) *Attorney, Agent, or Firm* — Sughrue Mion, PLLC; Richard C. Turner

(57) ABSTRACT

A communication management apparatus that manages transmission of data in a network in which plural communication nodes are connected via a transmission line in a ring shape, the apparatus including: a network-presence checking unit that transmits a network-presence-check frame in broadcast and generates network connection information indicating a connection state among the connection nodes from a received network-presence-check acknowledge frame, a token-circulation-order determining unit that determines token circulation order; a setup processing unit that performs setup processing for notifying each of the communication nodes of a token circulation destination; a data-frame-communication processing unit that performs transmission and reception of a data frame using a token frame; and a line-connection managing unit that disables, when the network has a ring configuration, any one of ports of any one of the communication nodes to prevent a connection state of the network from becoming a ring shape.

15 Claims, 18 Drawing Sheets

(51) Int. Cl.
*G06F 15/16* (2006.01)
*H04L 12/437* (2006.01)
*H04L 12/403* (2006.01)
*H04L 12/433* (2006.01)
*H04L 12/24* (2006.01)

(56) References Cited

FOREIGN PATENT DOCUMENTS

| | | |
|---|---|---|
| JP | 2009-089433 A | 4/2009 |
| WO | 2007/119534 A1 | 3/2007 |

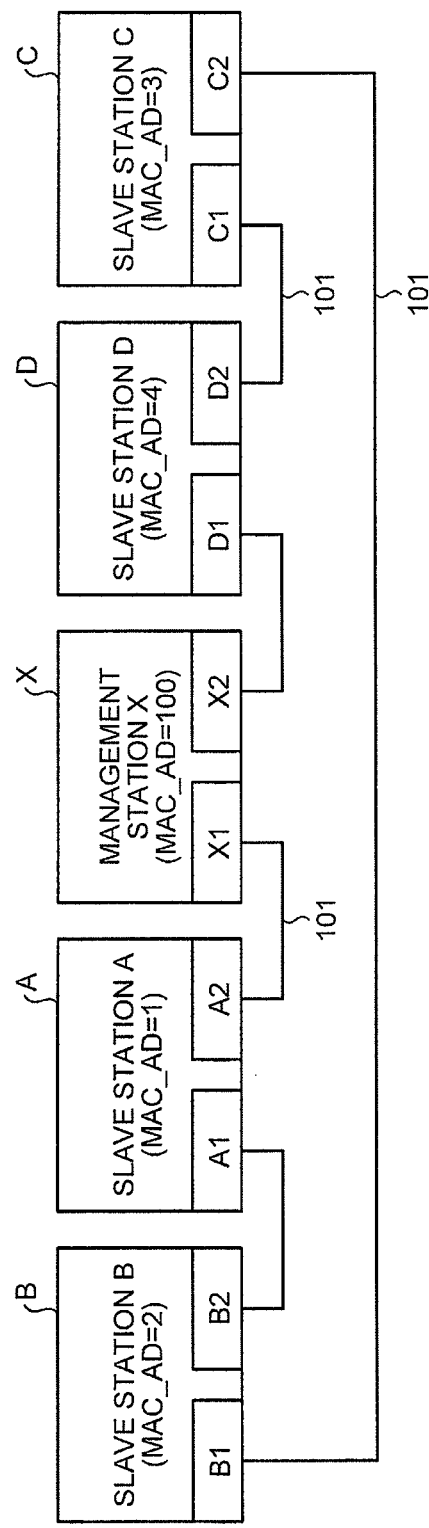

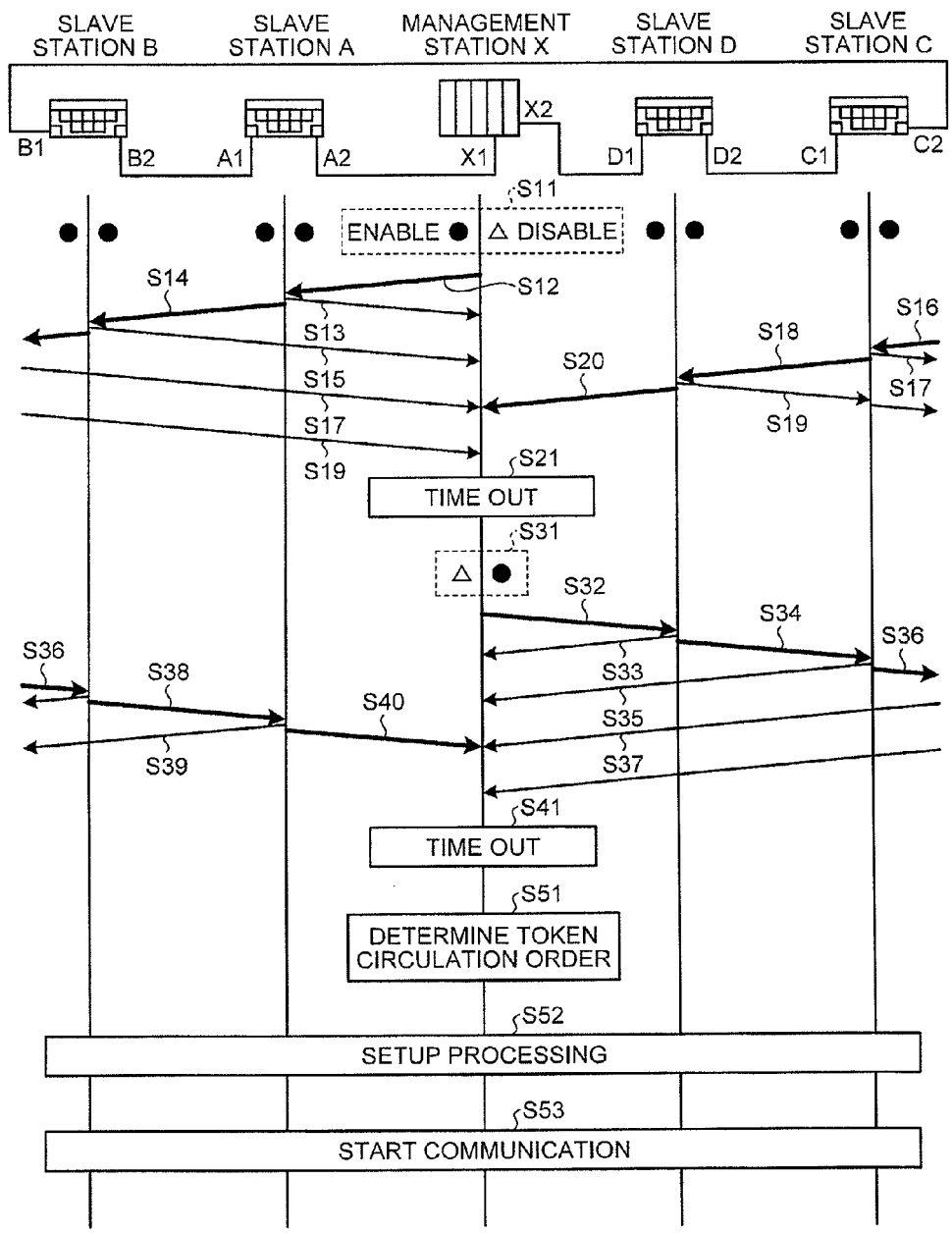

FIG.5

| NETWORK PRESENCE CHECK FRAME | DA | SA | type | FRAME TYPE INFOR-MATION | MAC ADDRESS INFORMATION OF MANAGEMENT STATION | TRANSMISSION PORT INFORMATION OF NETWORK PRESENCE CHECK FRAME OF OWN STATION | |
|---|---|---|---|---|---|---|---|
| TestDataFrame (X1→all) | F | 100 | ** | TestData | 100 | X1 | ~501 |
| TestDataFrame (A1→all) | F | 1 | ** | TestData | 100 | A1 | ~502 |
| TestDataFrame (B1→all) | F | 2 | ** | TestData | 100 | B1 | ~503 |
| TestDataFrame (C1→all) | F | 3 | ** | TestData | 100 | C1 | ~504 |
| TestDataFrame (D1→all) | F | 4 | ** | TestData | 100 | D1 | ~505 |

FIG.6

| NETWORK PRESENCE CHECK ACKNOWLEDGE FRAME | DA | SA | type | FRAME TYPE INFOR-MATION | SA INFORMATION IN RECEIVED NETWORK PRESENCE CHECK FRAME | PORT INFORMATION OF STATION THAT TRANSMITS NETWORK PRESENCE CHECK FRAME | |
|---|---|---|---|---|---|---|---|
| TestDataACKFrame (A2→X) | 100 | 1 | ** | TestData ACK | 100 | X1 | ~601 |
| TestDataACKFrame (B2→X) | 100 | 2 | ** | TestData ACK | 1 | A1 | ~602 |
| TestDataACKFrame (C2→X) | 100 | 3 | ** | TestData ACK | 2 | B1 | ~603 |
| TestDataACKFrame (D2→X) | 100 | 4 | ** | TestData ACK | 3 | C1 | ~604 |

FIG.7

| SA | SA INFORMATION IN RECEIVED NETWORK PRESENCE CHECK FRAME | PORT INFORMATION OF STATION THAT TRANSMITS NETWORK PRESENCE CHECK FRAME | |
|---|---|---|---|
| 1 | 100 | X1 | ~701 |
| 2 | 1 | A1 | ~702 |
| 3 | 2 | B1 | ~703 |
| 4 | 3 | C1 | ~704 |
| 4 | 100 | X2 | ~705 |
| 3 | 4 | D2 | ~706 |
| 2 | 3 | C2 | ~707 |
| 1 | 2 | B2 | ~708 |

FIG.9

| NETWORK PRESENCE CHECK FRAME | DA | SA | type | FRAME TYPE INFOR- MATION | MAC ADDRESS INFORMATION OF MANAGEMENT STATION | TRANSMISSION PORT INFORMATION OF NETWORK PRESENCE CHECK FRAME OF OWN STATION |
|---|---|---|---|---|---|---|
| TestDataFrame (X2→all) | F | 100 | ** | TestData | 100 | X2 |
| TestDataFrame (D2→all) | F | 4 | ** | TestData | 100 | D2 |
| TestDataFrame (C2→all) | F | 3 | ** | TestData | 100 | C2 |
| TestDataFrame (B2→all) | F | 2 | ** | TestData | 100 | B2 |
| TestDataFrame (A2→all) | F | 1 | ** | TestData | 100 | A2 |

FIG.10

| NETWORK PRESENCE CHECK ACKNOWLEDGE FRAME | DA | SA | type | FRAME TYPE INFOR- MATION | SA INFORMATION IN RECEIVED NETWORK PRESENCE CHECK FRAME | PORT INFORMATION OF STATION THAT TRANSMITS NETWORK PRESENCE CHECK FRAME |
|---|---|---|---|---|---|---|
| TestDataACKFrame (D1→X) | 100 | 4 | ** | TestData ACK | 100 | X2 |
| TestDataACKFrame (C1→X) | 100 | 3 | ** | TestData ACK | 4 | D2 |
| TestDataACKFrame (B1→X) | 100 | 2 | ** | TestData ACK | 3 | C2 |
| TestDataACKFrame (A1→X) | 100 | 1 | ** | TestData ACK | 2 | B2 |

COMMUNICATION MANAGEMENT APPARATUS, COMMUNICATION NODE, AND DATA COMMUNICATION METHOD

CROSS-REFERENCE TO RELATED APPLICATION

This application is a divisional of U.S. application Ser. No. 13/377,397 filed Dec. 9, 2011, which is a 371 of PCT Application No. PCT/JP2009/060800 filed Jun. 12, 2009. The above-noted applications are incorporated herein by reference in their entirety.

FIELD

The present invention relates to a communication management apparatus, a communication node, and a data communication method for performing communication using a token frame among communication nodes connected by a transmission line in a ring shape.

BACKGROUND

In a communication system in which communication apparatuses are connected by a transmission line in a ring shape (a loop shape) such that a communication apparatus including a master station, which includes first and second ports for switching a clockwise flow of information or a counterclockwise flow of information to the transmission line and a control unit for controlling ON/OFF states of the first and second ports, and a slave station, which includes first and second ports for switching a clockwise feeding of information or a counterclockwise feeding of information to the transmission line, connects a first port and a second port of another communication apparatus adjacent to the communication apparatus, a technology is proposed that enables the control unit of the master station to perform communication in a bus-type configuration by turning off a first or second port of any one of the communication apparatuses (see, for example, Patent Literature 1).

In this communication system, before communication is started, processing for checking, for example, presence or absence of occurrence of a breaking of wire and a failure of the slave station and performing reconfiguration to an appropriate bus-type transmission line is performed. First, the control unit of the master station turns off the first port, turns on the second port, forcibly changes the ring-shaped transmission line to a bus-type transmission line, turns on first ports of all slave stations, and turns off second ports of all the slave stations. In this state, when the control unit of the master station transmits a transmission command, an acknowledgement is returned from only a first slave station connected to the second port of the master station.

Therefore, a number of this first slave station is stored in a slave station position recognition area to clearly show connection order.

Subsequently, the control unit of the master station performs control to turn on the turned-off second port of the first slave station from which the acknowledgement is returned and transmits a transmission command anew. As a result, because an acknowledgement is returned from only a second slave station connected to a second port of the first slave station, the control unit of the master station stores, in the slave station position recognition area, indication that the second slave station is connected after the first slave station. The control unit repeatedly performs such processing and, when no new acknowledgement is received from the slave stations, determines that a slave station that returns an acknowledgement last is a slave station at the end. Thereafter, the control unit of the master station turns on the first port, turns off the second port, performs the same processing, and grasps the configuration of the communication system.

CITATION LIST

Patent Literature

Patent Literature 1: Japanese Patent Application Laid-open No. 2000-278295

SUMMARY

Technical Problem

However, in the technology described in Patent Literature 1, in the reconfiguration processing, only one of the slave stations connected to the master station as explained above can be recognized in the processing performed once. Therefore, there is a problem in that, for example, when a communication system includes several tens or several hundreds or more communication apparatuses, time required for the reconfiguration processing increases. Therefore, there is a problem in that it is difficult to apply such a communication system to an FA (Factory Automation) system in which communication apparatuses in a unit of several tens or a unit of several hundreds are connected to one another. There is a problem in that it is necessary to provide, in each of the communication apparatuses, a circuit for transmitting information clockwise and a circuit for transmitting information counterclockwise and manufacturing cost for hardware increases.

In the communication system described in Patent Literature 1, a solution concerning an unstable cable state in which states of a breaking of wire (abnormality) and live wire (normal) alternately change in a short time in a state in which a cable is nearly broken, is not shown. Therefore, there is a problem in that a network cannot be surely controlled in such a case.

The present invention is devised in view of the above and it is an object of the present invention to obtain, in a communication system in which communication apparatuses are connected by a transmission line in a ring shape, which is a communication system that can perform transmission and reception processing for a data frame in the same manner as the case of line-type connection, a communication management apparatus, a communication node, and a data communication method that can reduce time required for processing for grasping the configuration of a network compared with the past and simplify an apparatus configuration. It is also an object of the present invention to obtain a communication management apparatus, a communication node, and a data communication method that can surely control a network even in an unstable cable state.

Solution to Problem

In order to solve above-mentioned problems and achieve the object, there is provided a communication management apparatus that manages transmission of data in a token passing system in a network in which a plurality of communication nodes are connected via a transmission line in a ring shape, the communication management apparatus including two ports connected to, via the transmission line, the communication nodes adjacent to the communication management apparatus; a line-connection managing unit that gives an instruction for switching a port of any one of the communication nodes on the network including the own apparatus to a disabled state in which frame transmission and reception is impossible and an enabled state in which frame transmission and reception is possible; a network-presence checking unit that transmits, in broadcast, a network presence check frame for recognizing the communication node present in the network, receives a network presence check acknowledge frame including a relation between a communication node adjacent to the communication node and ports of the communication node, and performs network presence check processing for generating network connection information indicating a connection state between the communication nodes; a token-circulation-order determining unit that determines token circulation order using the network connection information; a setup processing unit that performs, based on the token circulation order, setup processing for notifying each of the communication nodes in the network of a communication node to which the transmission right is granted after the communication node; and a data-frame-communication processing unit that performs transmission and reception of a data frame using a token frame, wherein when the line-connection managing unit recognizes, according to the network connection information, that the network has a ring configuration, the line-connection managing unit disables any one of ports of any one of the communication nodes in the network to prevent a connection state of the network from becoming a ring shape.

Advantageous Effects of Invention

According to the present invention, there is an effect that, in a communication system in which communication apparatuses are connected by a transmission line in a ring shape, which is a communication system that can perform transmission and reception processing for a data frame in the same manner as the case of line-type connection, it is possible to reduce time required for processing for grasping the configuration of a network compared with the past and simplify an apparatus configuration compared with the past.

BRIEF DESCRIPTION OF DRAWINGS

FIG. 1 is a schematic diagram of an example of a communication system in which communication is performed using a token according to a first embodiment.

FIG. 2-1 is a schematic block diagram a functional configuration of a management station.

FIG. 2-2 is a schematic block diagram of a functional configuration of a slave station.

FIG. 3-1 is a diagram of an example of a format of a network presence check frame.

FIG. 3-2 is a diagram of an example of a format of a network presence check acknowledge frame.

FIG. 4 is a sequence chart of an example of a data communication method during the start according to the first embodiment.

FIG. 5 is a diagram of an example of a network presence check frame.

FIG. 6 is a diagram of an example of the network presence check acknowledge frame.

FIG. 7 is a diagram of an example of generated network presence information.

FIG. 8-1 is a schematic diagram of an example of a method of generating network connection information (No. 1).

FIG. 8-2 is a schematic diagram of an example of the method of generating network connection information (No. 2).

FIG. 8-3 is a schematic diagram of an example of the method of generating network connection information (No. 3).

FIG. 8-4 is a schematic diagram of an example of the method of generating network connection information (No. 4).

FIG. 9 is a diagram of an example of a network presence check frame.

FIG. 10 is a diagram of an example of a network presence check acknowledge frame.

DESCRIPTION OF EMBODIMENTS

Preferred embodiments of a communication management apparatus, a communication node, and a data communication method according to the present invention are explained in detail below with reference to the accompanying drawings. The present invention is not limited by the embodiments.

First Embodiment.

Figures 1, 2:
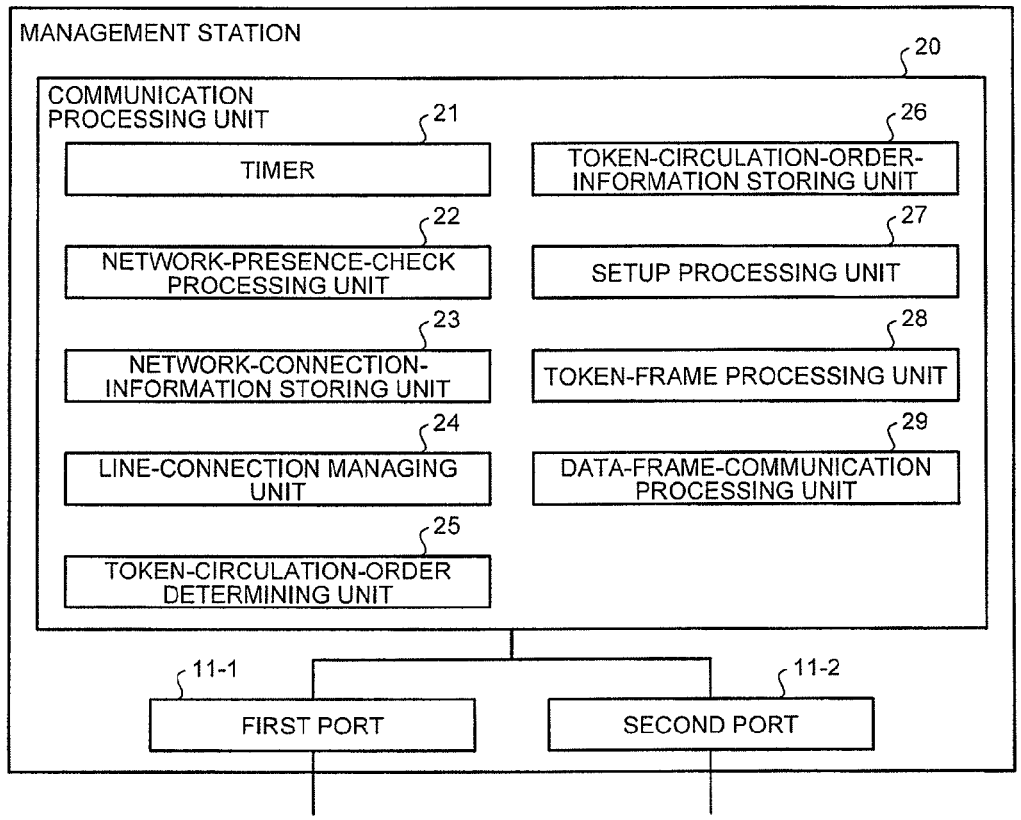
Figure 2:
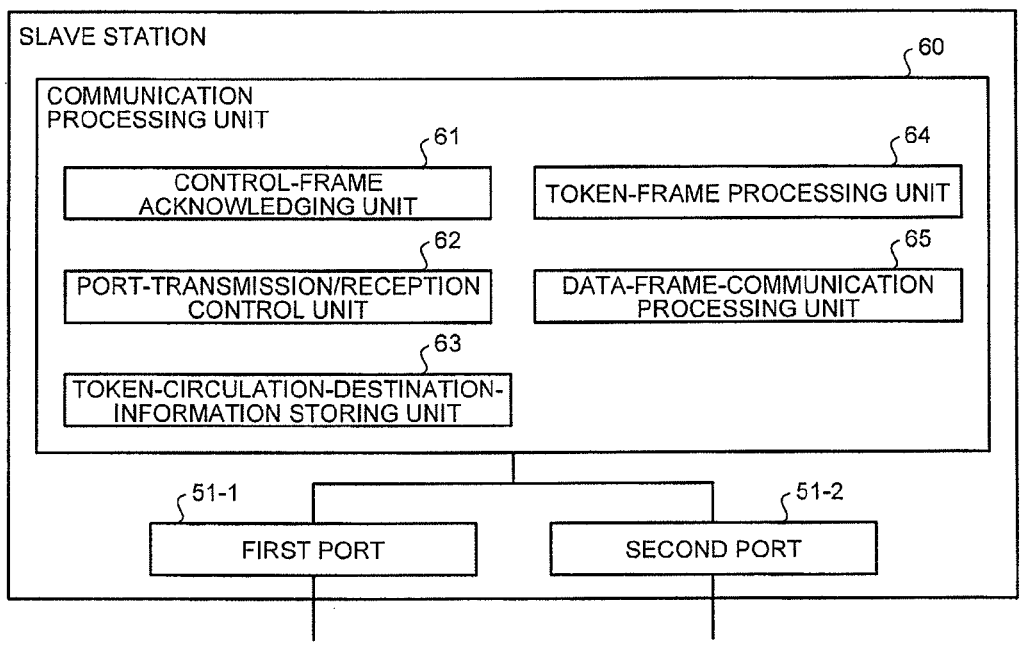

FIG. 1 is a schematic diagram of an example of a communication system in which communication is performed using a token according to a first embodiment. This communication system includes a network of the same segment in which a plurality of communication nodes X and A to D are connected by a transmission line 101 in a ring shape. Each of the communication nodes X and A to D includes two ports. The ports of the communication nodes are connected by a cable for enabling half-duplex communication such as a coaxial cable or a cable for enabling full-duplex communication such as a twisted pair cable or an optical fiber. It is assumed that the communication nodes X and A to D are connected by an Ethernet (registered trademark; the same applies below). In this example, as the communication nodes X and A to D, one management station X functioning as a communication management apparatus that manages transmission and reception of data (frames) in the network of the same segment and four slave stations A to D that perform transmission of data (frames) based on setting by the management station X are provided.

As shown in FIG. 1, a second port A2 of the slave station A is connected to a first port X1 of the management station X. A second port B2 of the slave station B is connected to a first port A1 of the slave station A. A second port C2 of the slave station C is connected to a first port B1 of the slave station B. A second port D2 of the slave station D is connected to a first port C1 of the slave station C. A second port X2 of the management station is connected to a first port D1 of the slave station D. The communication nodes are connected in a ring shape. From another point of view, the management station X and the slave stations A to D are linearly connected and the transmission line 101 is provided between the management station X and the slave station D.

MAC (Media Access Control) addresses (in the figure, represented as MAC_AD) of the communication nodes are set as explained below.
Management station X=100
Slave station A=1
Slave station B=2
Slave station C=3
Slave station D=4

In this first embodiment, in the communication system in which the communication nodes X and A to D are connected in a ring (loop) shape by the Ethernet, the management station X grasps a connection relation among the communication nodes (the management station X and the slave stations A to D) during the start and, when the communication system is formed in a ring shape, disables the ports of any one of the communication nodes, forcibly changes the communication system to a line-type connection configuration, and performs communication. In an example of this communication system explained below, a frame (a token frame) for obtaining a data transmission right called token is transmitted in order to the communication nodes in the communication system and a communication node that acquires the token performs transmission of data to the other communication nodes.

As explained above, the communication system has a ring configuration as a physical network configuration. The ports of at least one communication node of the communication system are disabled, whereby transmission processing for data can be performed on the assumption that the communication nodes are linearly connected.

FIG. 2-1 is a schematic block diagram of a functional configuration of the management station. The management station includes two ports 11-1 and 11-2 for connecting an Ethernet cable between the management station and a communication node (a slave station) adjacent to the management station and a communication processing unit 20 that performs, for example, transmission and reception processing for a frame via the ports 11-1 and 11-2 and processing for recognizing a connection configuration of the network and establishing transmission order for token frames.

The ports 11-1 and 11-2 include two ports: a first port 11-1 and a second port 11-2. Both of these two ports 11-1 and 11-2 are connected to ports of a slave stations adjacent to the management station.

The communication processing unit 20 includes a timer 21, a network-presence-check processing unit 22, a network-connection-information storing unit 23, a line-connection managing unit 24, a token-circulation-order determining unit 25, a token-circulation-order-information storing unit 26, a setup processing unit 27, a token-frame processing unit 28, and a data-frame-communication processing unit 29.

The timer 21 is started by a processing unit in the communication processing unit 20 and has a function of measuring a predetermined time. In this first embodiment, the timer 21 measures the elapse of the predetermined time or more after a network presence check acknowledge frame from a slave station is received in the ports 11-1 and 11-2.

After a power supply for the own apparatus is turned on or after a state set in advance occurs as explained in the following embodiments, the network-presence-check processing unit 22 performs network presence check processing for detecting a connection state of the communication nodes included in the communication system (a network of the same segment) and performs processing for recognizing a connection state of the communication nodes in the network. Specifically, the network-presence-check processing unit 22 creates a network presence check frame and transmits the network presence check frame in broadcast. The network-presence-check processing unit 22 generates network connection information, which is a connection state among the communication nodes present in the network, from information included in a network presence check acknowledge frame, which is an acknowledgement to the network presence check frame, from a communication node present in the communication system. In this specification, the network-presence-check processing unit 22 performs the creation of network connection information every time the network-presence-check processing unit 22 receives the network presence check acknowledge frame.

Figures 1, 3:
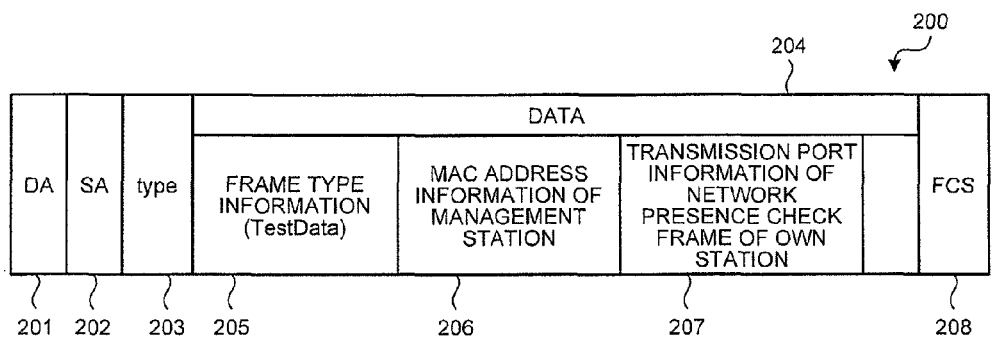
Figures 2, 3:
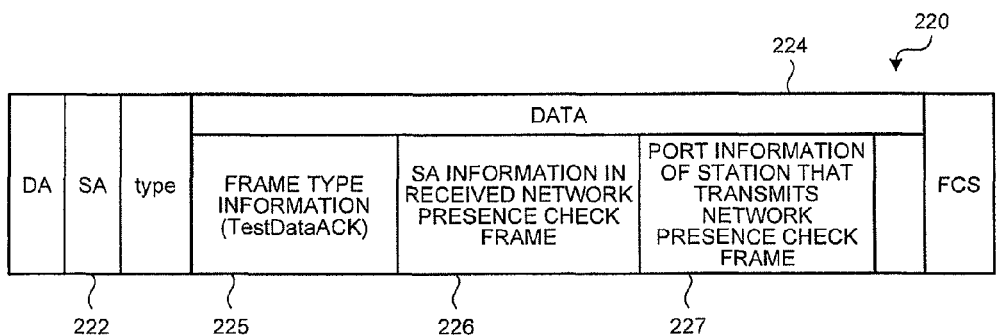

FIG. 3-1 is a diagram of an example of a format of the network presence check frame. A network presence check frame 200 is an Ethernet frame and includes a destination MAC address (hereinafter referred to as DA) 201, a transmission source MAC address (hereinafter referred to as SA) 202, an Ethernet type 203, data 204 that stores data of a higher layer, and an FCS (Frame Check Sequence) 208 that stores a result of check whether an error is present in information stored in the DA 201 to the data 204 of the own frame.

In this first embodiment, frame type information 205, management station MAC address information 206, and transmission port information of the network presence check frame of the own station 207 are stored in a part of the data 204.

The frame type information 205 is information for identifying what kind of frame the own Ethernet frame is. Information indicating that the Ethernet frame is the network presence check frame 200 is stored in this frame type information 205. In this example, the network presence check frame is represented as "TestData".

A MAC address of the management station X is stored in the management station MAC address information 206. In the transmission port information of the network presence check frame of the own station 207, port information indicating from which port a communication node transmits the network presence check frame 200 is stored.

FIG. 3-2 is a diagram of an example of a format of the network presence check acknowledge frame. This network presence check acknowledge frame 220 is also an Ethernet frame. Information used in this first embodiment is defined in data 224. Specifically, frame type information 225, SA information in the received network presence check frame 226, and port information of a station that transmits the network presence check frame 227 are stored in a part of the data 224.

Information indicating the network presence check acknowledge frame 220 is stored in the frame type information 225. In this specification, the network presence check acknowledge frame is represented as "TestDataACK". In the "SA information in the received network presence check frame" 226, a MAC address stored in an area of the SA 202 of the network presence check frame 200 received by a communication node (a slave station) is stored. In the "port information of a station that transmits the network presence check frame" 227, port information stored in the "transmission port information of the network presence check frame of the own station" 207 of an area of the data 204 in the network presence check frame 200 received by a communication node (a slave station) is stored.

When the network-presence-check processing unit 22 receives the network presence check acknowledge frame 220, the network-presence-check processing unit 22 generates network presence information in which the "SA information in the received network presence check frame" 226 and the "port information of a station that transmits the network presence check frame" 227 in the data 224 are associated with the "SA" 222 of the received network presence check acknowledge frame 220. The network-presence-check processing unit 22 creates, using the network presence information, a link information including the ports of the communication nodes connected to the own station as network connection information.

The network-connection-information storing unit 23 stores network connection information generated by the network-presence-check processing unit 22. The network connection information includes a communication node sequence connected beyond the first port 11-1 of the own apparatus and a communication node sequence connected beyond the second port 11-2 of the own apparatus. The network connection information is network connection information obtained by integrating the communication node sequences as one communication node sequence. These communication node sequences also include a connection relation among the ports of the communication nodes in the network.

The line-connection managing unit 24 performs, to prevent a frame from circulating in the network physically connected in a ring shape, enabling and disabling of the ports of the communication nodes such that the communication nodes are linearly connected. The line-connection managing unit 24 performs processing for enabling and disabling the ports of the communication nodes other than the own apparatus by transmitting a port control frame for designating which ports are enabled and disabled to the communication nodes. In this first embodiment, when a network configuration is a ring shape according to the network connection information, the line-connection managing unit 24 disables one of the first and second ports 11-1 and 11-2 of the own station. When a port is disabled by the line-connection managing unit 24, transmission and reception of a frame (a frame in a data link layer) in the port cannot be performed. When the network is not a ring shape according to the network connection information, the line-connection managing unit 24 controls enabling and disabling of the ports of the communication nodes such that the communication nodes are linearly connected.

After the network presence check processing by the network-presence-check processing unit 22, the token-circulation-order determining unit 25 performs, using the network connection information stored in the network-connection-information storing unit 23, processing for configuring a logical ring, i.e., processing for determining circulation order of token frames. The circulation order of the token frame can be determined in any way. For example, the circulation order can be order of the slave stations connected to the ports of the management station enabled at a point when the token circulation order is determined. The determined circulation order of the token frames is stored in the token-circulation-order-information storing unit 26 as token circulation order information.

When the token circulation order information is determined by the token-circulation-order determining unit 25, the setup processing unit 27 generates, using the token circulation order information, for each of the communication nodes (the slave stations) in the communication system, a setup frame including information concerning a communication node to which a transmission right is granted after the communication node and transmits the setup frame to the communication nodes. The setup processing unit 27 determines whether setup acknowledge frames, which are acknowledgements to the setup frame, are received from all the communication nodes. When the setup acknowledge frames are received from all the communication nodes, the setup processing unit 27 notifies the token-frame processing unit 28 to that effect.

The check whether the setup acknowledge frame is received from all the communication node can be performed by setting, for example, in a slave station corresponding to the network connection information of the network-connection-information storing unit 23, a flag indicating that the setup acknowledge frame is received.

When the token-frame processing unit 28 receives the notification indicating that the setup acknowledge frames are received from all the communication nodes in the communication system by the setup processing unit 27, the token-frame processing unit 28 generates a token frame according to the token circulation order information of the token-circulation-order-information storing unit 26 and transmits the token frame from the enabled port of the own station.

When the token-frame processing unit 28 receives a token frame transmitted from another communication node, the token-frame processing unit 28 determines whether the token frame grants a transmission right to the own station. As a result, when the token frame grants the transmission right to the own station, transmission processing for the data frame by the data-frame-communication processing unit 29 is performed. After the transmission processing for the data frame, the token-frame processing unit 28 transmits, based on the token circulation order information, the token frame to a communication node that obtains the transmission right next such that the communication node acquires the token frame. When the token frame does not grant the transmission right to the own station, the token-frame processing unit 28 determines that the transmission right is not obtained yet and transfers (repeats) the received token frame from another port, which is not the port where the token frame is received.

The data-frame-communication processing unit 29 performs transmission and reception processing for the data frame. For example, in the FA network, a controller connected to the management station calculates, at a predetermined period, data set in the slave stations A to D, converts the data into a data frame, and transmits the data frame to the slave stations A to D. The data-frame-communication processing unit 29 also has a function of receiving data frames transmitted from the slave stations A to D and transferring (repeating) data frames sent to other slave stations by the slave stations A to D.

In the frame type information 205 and 225 of the frames shown in FIGS. 3-1 and 3-2, "TestData", "TestDataACK", and the like are stored to identify the respective frames. However, numerical values for uniquely identifying the frames can be set in the respective frames and stored in the frame type information 205 and 225.

FIG. 2-2 is a schematic block diagram of a functional configuration of the slave station. The slave station includes two ports 51-1 and 51-2 for connecting an Ethernet cable between the slave station and a communication node (the management station or the slave station) adjacent to the slave station and a communication processing unit 60 that performs transmission and reception processing for a frame via the ports 51-1 and 51-2.

As in the management station, the ports 51-1 and 51-2 include two ports: a first port 51-1 and a second port 51-2. These two ports 51-1 and 51-2 are connected to the other communication nodes.

The communication processing unit 60 includes a control-frame acknowledging unit 61, a port-transmission/reception control unit 62, a token-circulation-destination-information storing unit 63, a token-frame processing unit 64, and a data-frame-communication processing unit 65.

The control-frame acknowledging unit 61 performs acknowledgement to the network presence check frame 200 and control frames such as a port control frame and a setup frame from the management station. For example, when the control-frame acknowledging unit 61 receives the network presence check frame 200, the control-frame acknowledging unit 61 generates the network presence check acknowledge frame 220 shown in FIG. 3-2 and returns the network presence check acknowledge frame 220 to the management station. When the control-frame acknowledging unit 61 receives the port control frame sent to the own station, the control-frame acknowledging unit 61 passes an instruction concerning enabling and disabling of ports in the port control frame to the port-transmission/reception control unit 62. When enabling and disabling processing for the ports in the port-transmission/reception control unit 62 ends, the control-frame acknowledging unit 61 generates a port control acknowledge frame and returns the port control acknowledge frame to the management station.

When the control-frame acknowledging unit 61 receives the setup frame sent to the own station, the control-frame acknowledging unit 61 acquires, from the setup frame, token circulation destination information indicating a communication node to which a token frame is transmitted next, stores the token circulation destination information in the token-circulation-destination-information storing unit 63, generates a setup acknowledge frame, and returns the setup acknowledge frame to the management station. In this specification, a frame exchanged between the management station and the slave station in the network presence check processing and the logical ring configuration processing is referred to as control frame. A frame transmitted according to acquisition of the token frame is referred to as data frame after the logical ring configuration.

The control-frame acknowledging unit 61 also has a function of reconfiguring and transmitting a frame or simply repeating the frame according to a frame type of a control frame received from the management station or another slave station. For example, when the control-frame acknowledging unit 61 receives the network presence check frame from the management station or another slave station, the control-frame acknowledging unit 61 performs processing for rewriting the SA 202 shown in FIG. 3-1 of the received network presence check frame and the transmission port information 207 of the network presence check frame of the own station in the data 204, reconfigures the network presence check frame, and outputs the network presence check frame from a port other than the reception port.

Further, for example, the control-frame acknowledging unit 61 has a function of, when the setup frame from the management station, the network presence check acknowledge frame 220 from other slave station or the control frame including the port control acknowledge frame or the setup acknowledge frame is received, not performing any processing for the frame and simply repeating the frame.

The port-transmission/reception control unit 62 has a function of, when enabling or disabling a port is instructed by the port control frame from the management station, controlling enabling and disabling of the port based on the instruction. When a port is disabled by the port-transmission/reception control unit 62, transmission and reception of a data frame (a frame of a data link layer) cannot be performed in the port. When the port-transmission/reception control unit 62 performs enabling or disabling of the port based on the instruction from the management station, the port-transmission/reception control unit 62 notifies the control-frame acknowledging unit 61 that the processing is completed.

The token-circulation-destination-information storing unit 63 stores a MAC address of a communication node that obtains a transmission right after the own communication node (the slave station). As explained above, the MAC address is acquired from the setup frame received from the management station. It is assumed that the token-circulation-destination-information storing unit 63 stores only a MAC address of a communication node to which a token should be transmitted next. Consequently, it is possible to hold down a data amount compared with the token circulation order storage information stored by the management station X.

When the token-frame processing unit 64 receives a token frame transmitted from another communication node, the token-frame processing unit 64 determines whether the token frame grants a transmission right to the own station. As a result, when the token frame grants the transmission right to the own station, the transmission processing for a data frame by the data-frame-communication processing unit 65 is performed. After the transmission processing for the data frame, the token-frame processing unit 64 transmits, based on the token circulation order information, the token frame to a communication node that obtains the transmission right next such that the communication node acquires the token frame. When the token frame does not grant the transmission right to the own station, the token-frame processing unit 64 determines that the transmission right is not obtained yet and transfers (repeats) the received token frame from another port, which is not the port where the token frame is received.

The data-frame-communication processing unit 65 performs transmission and reception processing for the data frame. Specifically, the data-frame-communication processing unit 65 performs transmission and reception processing for the data frame between the management station and the other slave stations.

A data communication method in such a communication system is explained. FIG. 4 is a sequence chart of an example of a data communication method during the start according to the first embodiment. In FIG. 4, a configuration in which the four slave stations A to D are connected to the management station X in a ring shape is shown. However, this is an example. When an arbitrary number of slave stations are connected to the management station X, data communication can be performed by a method same as processing explained below.

First, after the management station X and the slave stations A to D are connected by an Ethernet cable, power supplies for the slave stations A to D are turned on. In this state, the slave stations A to D wait for reception of a network presence check frame from the management station X. Both the first and second ports of these slave stations A to D are enabled.

Thereafter, when a power supply for the management station X is turned on, the management station X performs processing explained below to recognize slave stations connected on a network of the same segment including the management station X. First, the line-connection managing unit 24 of the communication processing unit 20 of the management station X disables one port of the own station, i.e., the second port X2 and makes it possible to transmit and receive a frame only in the first port X1 (step S11).

Subsequently, the network-presence-check processing unit 22 of the management station X generates a network presence check frame and transmits the network presence check frame from the first port X1 in broadcast (step S12). FIG. 5 is a diagram of an example of the network presence check frame. In a network presence check frame 501 transmitted from the first port X1 of the management station X, a broadcast address (e.g., in two-byte notation, "FFFF (all F)") is set in "DA", a MAC address "100" of the management station X is set in "SA", "TestData" is stored in "frame type information", the MAC address "100" of the own station is stored in "MAC address information of management station", and "X1" indicating the first port is set in "transmission port information of network presence check frame of own station".

As explained above, because the communication nodes are connected in the ring shape, first, the network presence check frame 501 reaches the slave station A. When the slave station A receives the network presence check frame in the second port A2, the control-frame acknowledging unit 61 generates a network presence check acknowledge frame and returns the network presence check acknowledge frame to the management station X from the second port A2 where the network presence check frame 501 is received (step S13).

FIG. 6 is a diagram of an example of the network presence check acknowledge frame. In a network presence check acknowledge frame 601 transmitted from the second port A2 of the slave station A, the MAC address "100" of the management station X is set in "DA", a MAC address "1" of the own station is set in "SA", "TestDataACK" is stored in "frame type information", and "100" and "X1" are respectively set in "SA information in received network presence check frame" and "port information of station that transmits network presence check frame" with reference to "SA" and "transmission port information of network presence check frame of own station" of the received network presence check frame 501 shown in FIG. 5.

Thereafter, the control-frame acknowledging unit 61 of the slave station A generates a network presence check frame 502 obtained by rewriting the network presence check frame 501 received from the second port A2 and transmits the rewritten network presence check frame 502 from the first port A1 (step S14). As shown in FIG. 5, in the network presence check frame 502, "SA" of the received network presence check frame 501 is rewritten to a MAC address "1" of the own station and "transmission port information of network presence check frame of own station" is rewritten to "A1".

Thereafter, the network presence check frame is repeated to the slave stations B, C, and D in order. When the slave stations B, C, and D receive network presence check frames 502 to 504, the slave stations B, C, and D perform processing same as the processing in the slave station A. Specifically, the control-frame acknowledging units 61 of the slave stations B, C, and D that receive the network presence check frames 502 to 504 generate network presence check acknowledge frames 602 to 604 and return the network presence check frames 502 to 504 to the management station X from the second ports where the network presence check frames 502 to 504 are received (steps S15, S17, and S19). The control-frame acknowledging units 61 of the slave stations B, C, and D generate network presence check frames 503 to 505 obtained by rewriting "SA" and "transmission port information of network presence check frame of own station" of the network presence check frames 502 to 504 received from the second ports and transmit the rewritten network presence check frames from the first ports (steps S16, S18, and S20).

When the network-presence-check processing unit 22 of the management station X receives the network presence check acknowledge frame, the network-presence-check processing unit 22 starts the timer 21 and determines whether a network presence check acknowledge frame is received from the other slave stations with a predetermined time. When the network presence check acknowledge frame is received within the predetermine time, the network-presence-check processing unit 22 resets the timer 21 and performs time measurement again. Because another slave station is not connected beyond the slave station D (because the disabled second port of the own station is connected beyond the slave station D), the network-presence-check processing unit 22 does not receive a network presence check acknowledge frame after the reception of the network presence check acknowledge frame 604 from the slave station D. In other words, when the network-presence-check processing unit 22 receives the network presence check acknowledge frame 604 from the slave station D and resets the timer 21, time is out (step S21).

Every time the network-presence-check processing unit 22 receives a network presence check acknowledge frame from the slave stations A to D, the network-presence-check processing unit 22 generates network presence information, generates and updates network connection information, and stores the network connection information in the network-connection-information storing unit 23.

FIG. 7 is a diagram of an example of the generated network presence information. This network presence information includes items: SA, SA information in the received network presence check frame, and port information of a station that transmits the network presence check frame. The network-presence-check processing unit 22 of the management station X acquires, from the received network presence check acknowledge frame, respective kinds of information from areas where the items are defined.

Figures 1, 8:
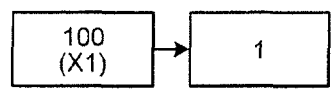
Figures 2, 8:
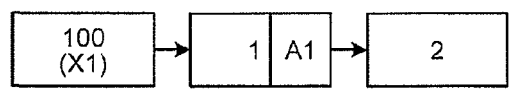
Figures 3, 8:
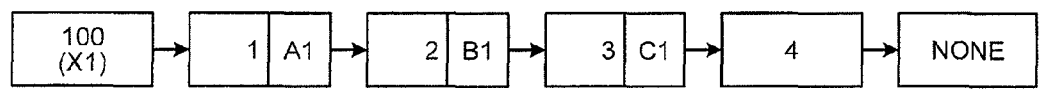
Figures 4, 8:
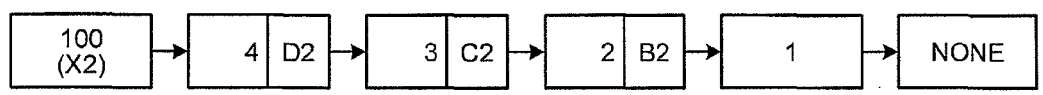

FIGS. 8-1 to 8-4 are schematic diagrams of an example of a method of generating network connection information. Network presence information at a point when the network presence check acknowledge frame 601 is received from the slave station A is only a record 701 shown in FIG. 7. Therefore, the network-presence-check processing unit 22 generates network connection information shown in FIG. 8-1. Specifically, the network-presence-check processing unit 22 selects the MAC address "100" of the own station and the first port "X1" of the ports of the own station and acquires, from the record 701 shown in FIG. 7, the MAC address "1 (the slave station A)" of the communication node connected to the first port X1 of the own station. The network-presence-check processing unit 22 records, for example, the connection relation shown in FIG. 8-1 as network connection information.

Network presence information at a point when the network presence check acknowledge frame 601 is received from the slave station B is records 701 and 702 shown in FIG. 7. Therefore, the network-presence-check processing unit 22 checks whether "SA information in received network presence check frame" same as the MAC address "1" of the communication node at the end of the network connection information is present and acquires a value "2" of "SA" of the record 702 as a MAC address of a communication node connected to the communication node at the end. The network-presence-check processing unit 22 acquires a value "A1" of "port information of station that transmits network presence check frame" of the record 702 as a port on a side connected to the new communication node at the end acquired as explained above. The network-presence-check processing unit 22 updates and records, for example, connection relation including the positions of ports shown in FIG. 8-2 as network connection information.

When the network-presence-check processing unit 22 receives the network presence check acknowledge frame, the network-presence-check processing unit 22 performs the same processing. At a point when a network presence check acknowledge frame is received from the slave station D, network connection information shown in FIG. 8-3 is generated using records 701 to 704 shown in FIG. 7.

When time-out is detected by the timer 21 set after the reception of the network presence check acknowledge frame from the slave station D (step S21), the line-connection managing unit 24 of the management station X performs processing for disabling the first port X1 and enabling the second port X2 (step S31). Processing same as steps S12 to S20 applied to the first port X1 is also applied to the second port X2 (steps S32 to S40).

Specifically, the network-presence-check processing unit 22 of the management station generates a network presence check frame and transmits the network presence check frame from the second port in broadcast (step S32). In this case, the network presence check frame reaches the slave stations D, C, B, and A in this order. The control-frame acknowledging units 61 of the slave stations A, B, C, and D that receive the network presence check frame generate network presence check acknowledge frames and return the network presence check acknowledge frames to the management station X from the first ports where the network presence check frame is received (steps S33, S35, S37, and S39). The control-frame acknowledging units 61 of the slave stations A, B, C, and D generate network presence check frames obtained by rewriting SA of the network presence check frame received from the second ports and transmission port information of the network presence check frame of the own stations and transmit the rewritten network presence check frames from the first ports (steps S34, S36, S38, and S40). FIG. 9 is a diagram of an example of the network presence check frame. FIG. 10 is a diagram of an example of the network presence check acknowledge frame. The network presence check frame and the network presence check acknowledge frame shown in the figures are created and fed.

Every time the network-presence-check processing unit 22 receives the network presence check acknowledge frame from the slave stations D to A, the network-presence-check processing unit 22 generates network presence information, generates network connection information, and stores the network connection information in the network-connection-information storing unit 23. The network presence information created at this point is indicated by records 705 to 709 shown in FIG. 7. Network connection information generated from this network presence information is shown in FIG. 8-4. Because the creation of the network connection information is the same as the method explained above, explanation of the creation of the network connection information is omitted.

Figure 11:
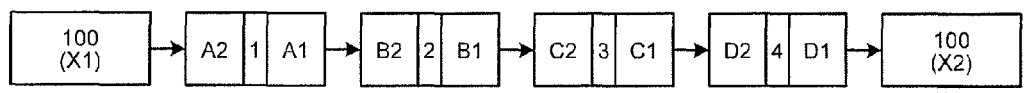
FIG. 11 is a diagram of an example of network connection information.

The network-presence-check processing unit 22 establishes final network connection information using results shown in FIGS. 8-3 and 8-4. FIG. 11 is a diagram of an example of the network connection information. A connection relation shown in FIG. 11 is obtained from a connection relation between the communication nodes and the ports shown in FIGS. 8-3 and 8-4. Because arrangement order of the connection nodes of the network connection information at the time when the second port X2 is disabled (FIG. 8-3) and arrangement order of the communication nodes of the network connection information at the time when the first port X1 is disabled coincide with each other, the network-presence-check processing unit 22 of the management station X recognizes that the network has a redundant ring configuration. When the network connection information is created, on condition that the communication node includes only two ports, ports not obtained from the results shown in FIGS. 8-3 and 8-4 are also added.

After determining first network connection information at the time when one port is disabled, in determining second network connection information at the time when the other port is disabled, when a slave station connected to the management station X is the last slave station (at the end) of the first network connection information, the token-circulation-order determining unit 25 can recognize that the network has a ring configuration and perform processing.

When the network connection information at the time when the second port X2 is disabled and the network connection information at the time when the first port X1 is disabled do not coincide with each other, the network-presence-check processing unit 22 determines that the network does not have the ring configuration. In this case, the line-connection managing unit 24 enables the first and second ports X1 and X2 and performs communication.

After detection of time-out at step S41, the token-circulation-order determining unit 25 determines token circulation order from network connection information shown in FIG. 11 (step S51). In this first embodiment, because the network has a ring configuration as a precondition, token circulation order is order of the slave stations connected to the currently enabled port (the second port X2) starting from the management station X. In other words, in this example, the token circulation order is the order of the management station X, the slave station D, the slave station C, the slave station B, the slave station A, and the management station X. However, this is an example and the token circulation order can be determined by other methods. The determined token circulation order is stored in the token-circulation-order-information storing unit 26.

Subsequently, the setup processing unit 27 of the management station X performs, using the token circulation order stored in the token-circulation-order-information storing unit 26, setup processing for notifying circulation information of a transmission right of the communication nodes (information indicating a communication node to which the transmission right is granted after a communication node that receives a token frame and acquires the transmission right) (step S52). In this first embodiment, the management station X notifies the slave stations A to D of the token circulation order using a setup frame. The slave stations A to D notify, using setup acknowledge frames, the management station X that the slave stations A to D receive the setup frame.

Thereafter, when the setup processing normally ends, the token-frame processing unit 28 and the data-frame-communication processing unit 29 of the management station X start, based on the token circulation order information, communication performed using a token frame (step S53). The management station X performs the communication using the token frame from the second port X2 while keeping the first port X1 of the management station X disabled. Consequently, the first port X1 of the management station X and the second port A2 of the slave station A are in a state same as a state in which the ports are not connected by a cable. Transmission and reception processing same as connection of line-type topology can be performed.

The processing at steps S11 to S41 is network presence check processing for checking the communication nodes included in the network and an array state of the communication nodes.

According to this first embodiment, in an Ethernet network having ring-type topology, one of ports is disabled during the start and communication is performed only by one port. Therefore, there is an effect that it is possible to perform communication physically using a protocol in the line-type topology in a network of the ring-type topology.

In the network presence check processing, the management station X only has to transmit the network presence check frame only once from each of the ports. Unlike the case of Patent Document 1 explained in the background art, it is unnecessary to transmit information for checking whether each of the communication nodes connected to the network is connected to the network. As a result, there is an effect that it is possible to end the network presence check processing in a short time compared with the case of Patent Document 1.

Further, unlike Patent Document 1, it is unnecessary to configure a circuit for circulating data clockwise and counterclockwise. Therefore, there is an effect that it is possible to hold down cost for configuring an apparatus compared with the past.

Second Embodiment.

In this second embodiment, system configuration recognition processing during the start performed by a method different from the method in the first embodiment is explained.

Figure 12:
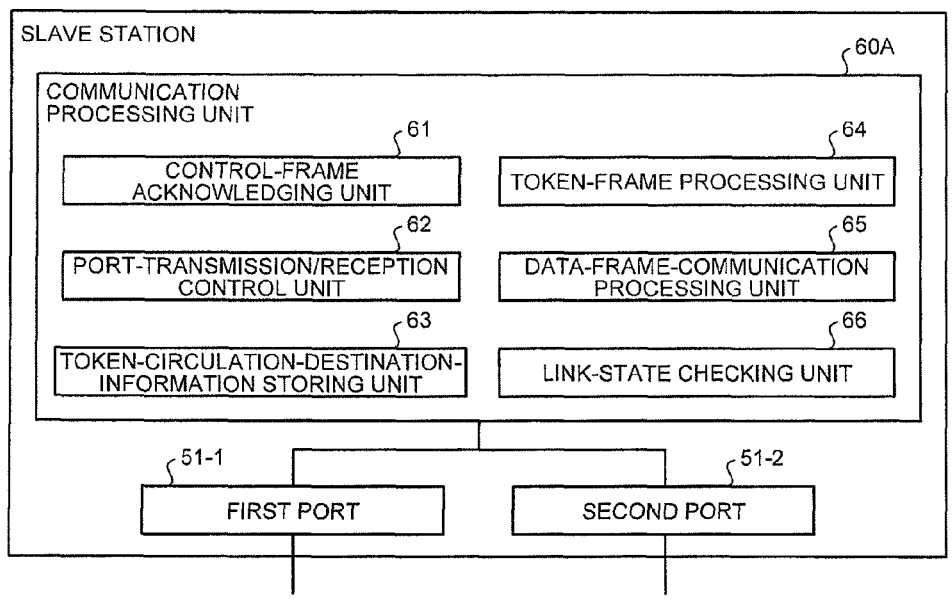
FIG. 12 is a schematic block diagram of a functional configuration of a slave station according to a second embodiment.

FIG. 12 is a schematic block diagram of a functional configuration of a slave station according to the second embodiment. This slave station further includes, in the configuration in the first embodiment, a link-state checking unit 66 in a communication processing unit 60A. This link-state checking unit 66 has a function of checking, for each of ports, using a link state signal, whether a state of a transmission line connected to the port is normal, i.e., whether a link state is normal between the slave station and a communication node adjacent to the slave station. For example, when a 10 Mbps Ethernet cable is used, the check of the link state can be performed by a link pulse exchanged in a physical layer. As the link state, there are two states: a normal state that is a communicable state in which a link state signal can be exchanged between the slave station and the adjacent communication node and an abnormal state that is an incommunicable state in which the link state signal cannot be exchanged between the slave station and the adjacent communication node.

Figure 13:
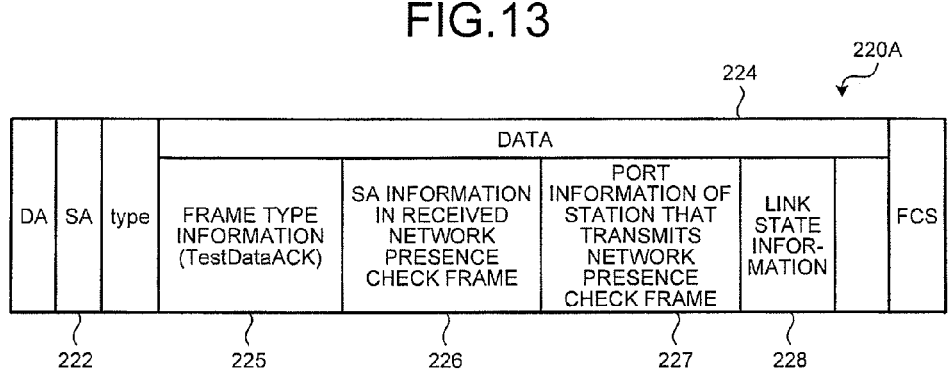
FIG. 13 is a diagram of an example of a network presence check acknowledge frame.

The control-frame acknowledging unit 61 has a function of setting, when a network presence check frame is received, a link state of the ports 51-1 and 51-2 checked by the link-state checking unit 66 at the point of the reception in a network presence check acknowledge frame and transmitting the network presence check acknowledge frame to the management station. FIG. 13 is a diagram of an example of the network presence check acknowledge frame. As shown in the figure, link state information 228 is provided in a part of the data 224 of a network presence check acknowledge frame 220A. A link state checked by the link-state checking unit 66 is stored in this link state information 228. Components same as those in the first embodiment are denoted by the same reference numerals and signs and explanation of the components is omitted. A management station used in the second embodiment is the same as the management station used in the first embodiment. Therefore, explanation of the management station is omitted.

Figure 14:
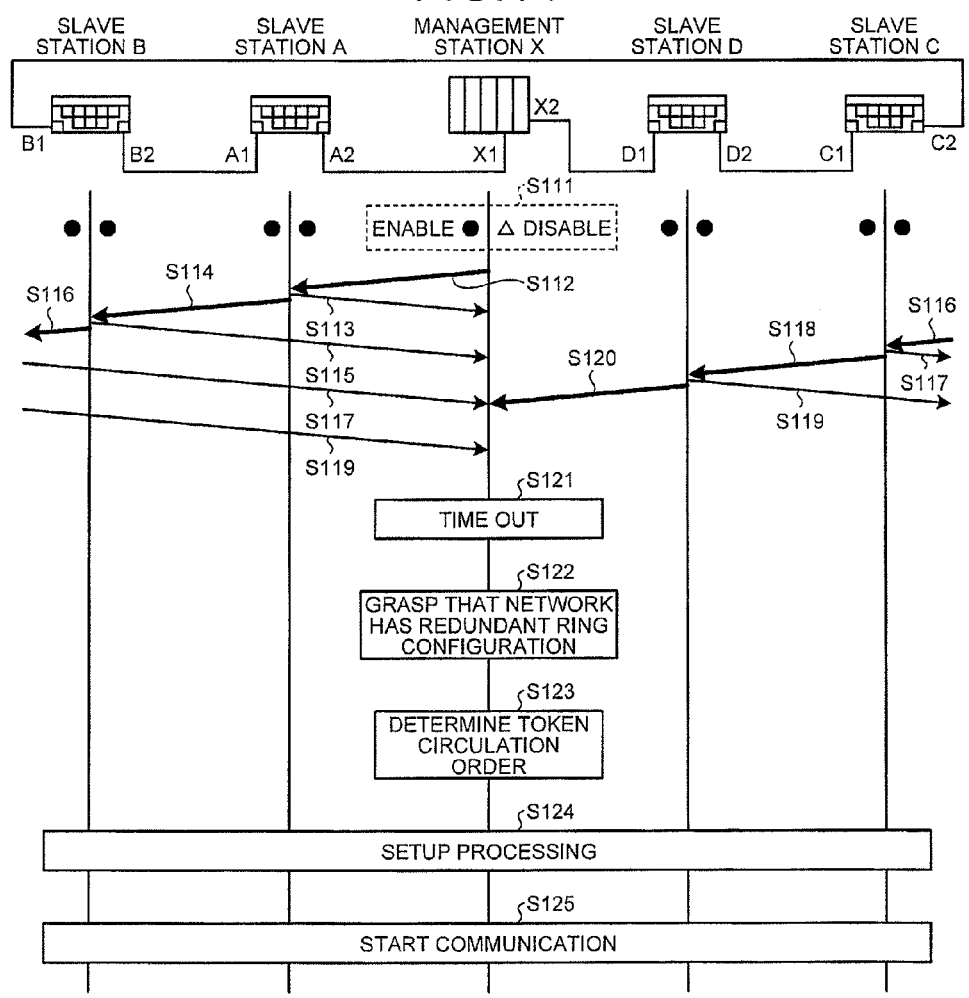
FIG. 14 is a schematic sequence chart of an example of a data communication method during the start according to the second embodiment.

A data communication method in such a communication system is explained below. FIG. 14 is a schematic sequence chart of an example of a data communication method during the start according to the second embodiment. In FIG. 14, a configuration in which the four slave stations A to D are connected to the management station X in a ring shape is shown. However, this is an example. When an arbitrary number of slave stations are connected to the management station X, data communication can be performed by a method same as processing explained below.

After the management station X and the slave stations A to D are connected by an Ethernet cable, the power supplies for the slave stations A to D are turned on. Thereafter, when the power supply for the management station X is turned on, the management station X performs processing explained below to recognize slave stations connected on a network of the same segment including the management station X. First, the line-connection managing unit 24 of the communication processing unit of the management station X disables one port of the own station, i.e., the second port X2 and makes it possible to transmit and receive a frame only in the first port X1 (step S111).

Subsequently, the network-presence-check processing unit 22 of the management station X generates a network presence check frame and transmits the network presence check frame from the first port X1 in broadcast (step S112). As explained above, because the communication nodes are connected in the ring shape, first, the network presence check frame reaches the slave station A.

When the control-frame acknowledging unit 61 of the slave station A receives the network presence check frame in the second port A2, the control-frame acknowledging unit 61 generates a network presence check acknowledge frame and returns the network presence check acknowledge frame to the management station X from the second port A2 where the network presence check frame is received (step S113). At this point, in the link state information 228 of the returned network presence check acknowledge frame 220A, a link state of the first and second ports A1 and A2 acquired before the link-state checking unit 66 transmits the network presence check acknowledge frame is set.

The control-frame acknowledging unit 61 of the slave station A rewrites a part of contents of the received network presence check frame and transmits the rewritten network presence check frame from the first port A1 (step S114).

Thereafter, the network presence check frame reaches the slave stations B, C, and D in order. When the slave stations B, C, and D receive the network presence check frame, the slave stations B, C, and D perform processing same as the processing in the slave station A. Specifically, the control-frame acknowledging units 61 of the slave stations B, C, and D that receive the network presence check frame generate the network presence check acknowledge frame 220A and returns the network presence check acknowledge frame 220A to the management station X from the second ports where the network presence check frame is received (steps S115, S117, and S119). The control-frame acknowledging units 61 of the slave stations B, C, and D transmits, from the first ports, network presence check frames obtained by rewriting a part of the contents of the network presence check frame received from the second ports (steps S116, S118, and S120).

When the network-presence-check processing unit 22 of the management station X receives the network presence check acknowledge frame 220A, the network-presencecheck processing unit 22 starts the timer 21 and determines whether the network presence check acknowledge frame 220A is received within a predetermined time. When the network presence check acknowledge frame 220A is received within the predetermined time, the network-presence-check processing unit 22 resets the timer 21 and performs time measurement again. Because another slave station is not connected beyond the slave station D (because the second port X2 of the management station X after the slave station D is disabled), when the network-presence-check processing unit 22 receives the network presence check acknowledge frame 220A from the slave station D and resets the timer, time is out (step S121).

Every time the network-presence-check processing unit 22 receives the network presence check acknowledge frame 220A from the slave stations A to D, as explained in the first embodiment, the network-presence-check processing unit 22 generates network connection information and stores the network connection information in the network-connection-information storing unit 23. At this point, when link states from all the slave stations A to D are normal, the management station X grasps that a network configuration is a redundant ring configuration (step S122).

Thereafter, as in the first embodiment, after determining token circulation order (step S123) and performing setup processing (step S124), the management station X starts communication processing for a data frame performed using a token frame (step S125).

According to this second embodiment, the slave station stores a link state of the two ports 51-1 and 51-2 in the network presence check acknowledge frame 220A. Therefore, it is possible to determine, according to acknowledgement by the network presence check frame transmitted from one port 11-1 or 11-2 of the management station X, whether the network has a ring configuration. In other words, the network presence check frame for recognizing a network state is output once. Therefore, there is an effect that it is possible to reduce time required for the network presence check processing compared with the case of the first embodiment.

Third Embodiment.

In this third embodiment, ring reconfiguration processing (network presence check processing) performed when a communication node stops operating or a cable breaking occurs during communication performed using a token is explained.

A management station used in this third embodiment is the same as that management station used in the first embodiment. Slave stations are the same as the slave stations used in the second embodiment. However, the data-frame-communication processing unit 65 of each of the slave stations has a function of embedding, in a data frame, a link state of the two ports 51-1 and 51-2 checked by the link-state checking unit 66 before the data frame is transmitted and outputting the data frame. In the data frame in this case, as explained concerning the format of the network presence check acknowledge frame shown in FIG. 13 in the second embodiment, link state information for storing the link state checked by the link-state checking unit 66 is provided in a part of data.

Figure 15:
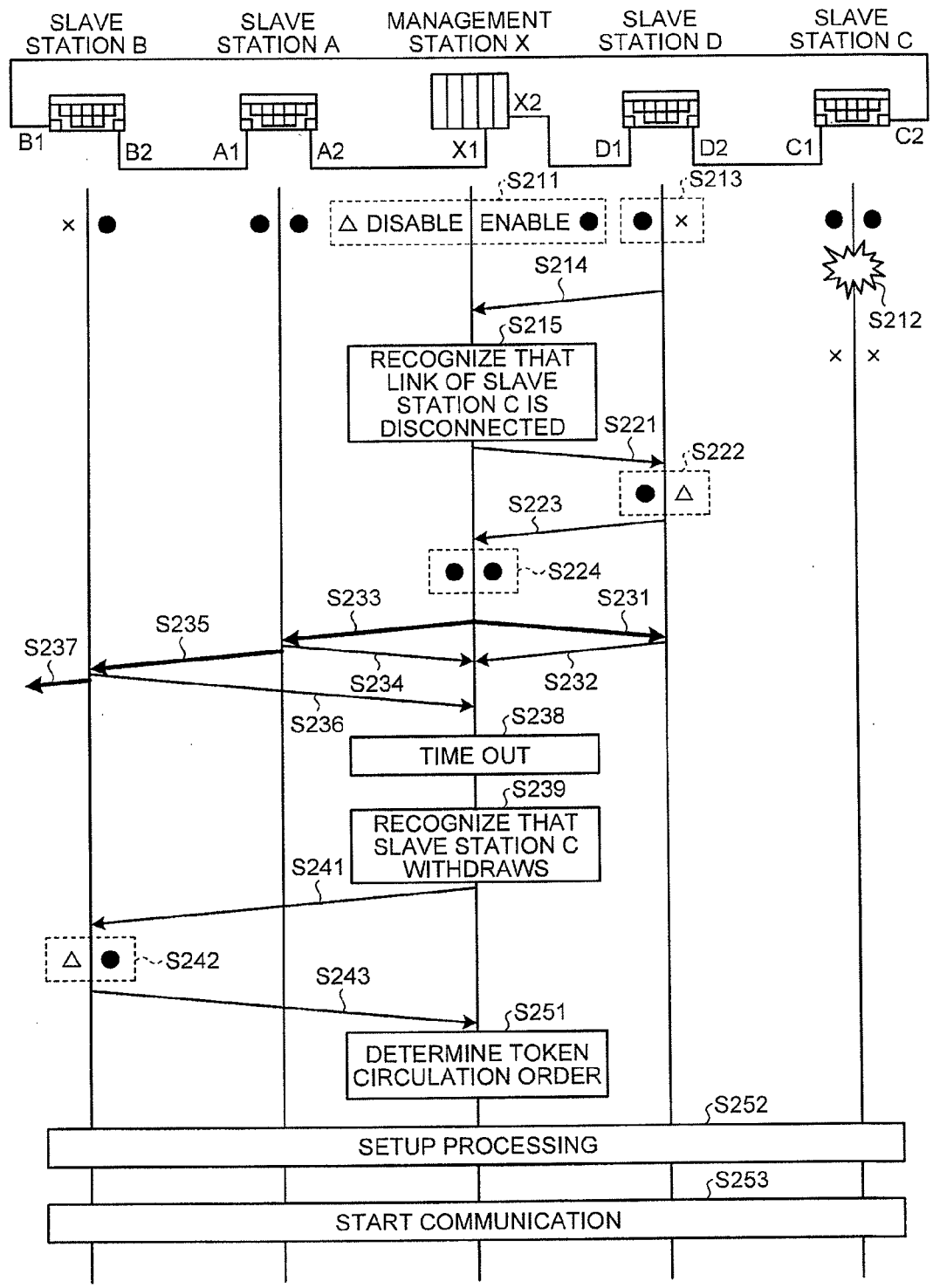
FIG. 15 is a sequence chart of an example of a procedure of ring reconfiguration processing performed when a communication node stops operating.

First, the ring reconfiguration processing (the network presence check processing) performed when a communication node stops operating is explained. FIG. 15 is a sequence chart of an example of a procedure of the ring reconfiguration processing performed when a communication node stops operating. In FIG. 15, a configuration in which the four slave stations A to D are connected to the management station X in a ring shape is shown. However, this is an example. When an arbitrary number of slave stations are connected to the management station X, data communication can be performed by a method same as processing explained below.

First, it is assumed that, in this network, although the management station X and the slave stations A to D are connected by a cable in a ring shape, the first port X1 of the management station X is disabled (step S211), whereby transmission and reception of a data frame is performed in order of (1) described below using a token frame as line-type topology of the management station X, the slave station D, the slave station C, the slave station B, and the slave station A.

The management station X→the slave station D→the slave station C→the slave station B→the slave station A→the management station X (1)

It is assumed that, immediately before the slave station D acquires a token frame, the slave station C stops operating (a power supply is turned off) because of some cause (step S212). At this point, because a link check signal such as a link pulse periodically exchanged in a physical layer between the slave station D and a communication node adjacent to the slave station D is not obtained from the slave station C, the link-state checking unit 66 of the slave station D recognizes that a link of the slave station C is disconnected (i.e., the power supply for the slave station C is turned off or a cable breaking between the slave station D and the slave station C occurs) (step S213). The slave station B also recognizes that the link of the slave station C is disconnected.

Thereafter, when the slave station D acquires a token frame according to token circulation order decided in advance, the data-frame-communication processing unit 65 of the slave station D stores, in link state information in a data frame, information indicating that the link of the slave station C is disconnected and transmits the data frame to the management station X (step S214). Specifically, the data-frame-communication processing unit 65 stores, in the link state information of the data frame, indication that the first port D1 is normal but the second port D2 is abnormal and transmits the data frame to the management station X.

Subsequently, the management station X receives the data frame from the slave station D and performs normal reception processing. At this point, because the information indicating that the link of the slave station C is disconnected is included in the link state information, the management station X recognizes that the slave station C withdraws (step S215).

The line-connection managing unit 24 of the management station X transmits, to the slave station D, a port control frame for disabling the second port D2 on the slave station C side of the slave station D that informs the link disconnection of the slave station C (step S221). When the port-transmission/reception control unit 62 of the slave station D receives the port control frame, the port-transmission/reception control unit 62 performs, according to contents of the port control frame, processing for disabling the second port D2 (step S222). The control-frame acknowledging unit 61 of the slave station D transmits, to the management station X, a port control acknowledge frame indicating that the disabling of the second port D2 is completed (step S223).

When the line-connection managing unit 24 of the management station X receives the port control acknowledge frame from the slave station D, the line-connection managing unit 24 enables the first port X1 (step S224). This is because, when the first port X1 is kept disabled, the management station X can communicate with only the slave station D. Consequently, both the first and second ports X1 and X2 of the management station X are enabled. The management station X can communicate with the slave stations A and B besides the slave station D.

Thereafter, the network-presence-check processing unit 22 of the management station X transmits a network presence check frame from the first and second ports X1 and X2 in broadcast (steps S231 and S233).

The network presence check frame transmitted from the second port X2 is received by the slave station D. A network presence check acknowledge frame is returned from the slave station D (step S232). This network presence check acknowledge frame includes link states of the ports at a point when the network presence check frame checked by the link-state checking unit 66 is received. In the slave station D, because the second port D2 is disabled, the received network presence check frame is not transmitted to the slave station C connected beyond the second port D2 of the slave station D.

At this point, it is also conceivable that the slave station C is restored in a moment. In this case, in a transmission line between the second port D2 of the slave station D and the first port C1 of the slave station C, exchange of a link check signal is performed in a physical layer. However, in a data link layer, because the second port D2 of the slave station D is disabled, the network presence check frame is not repeated to the slave station C. Therefore, it is possible to prevent the slave station C, which operates unstably, from entering the network in the ring reconfiguration processing. If the second port D2 of the slave station D is not disabled, the network has a ring configuration in which all the ports of the management station X and the slave stations A to D are enabled. A frame permanently circulates in the network. Therefore, it is possible to prevent occurrence of such a situation.

On the other hand, the network presence check frame transmitted from the first port X1 of the management station X is received by the slave station A. A network presence check acknowledge frame is returned from the slave station A to the management station X (step S234). The slave station A rewrites a part of contents of the network presence check frame and repeats the network presence check frame from the second port A2 to the first port A1 (step S235). Similarly, when the slave station B receives the network presence check frame, the slave station B transmits a network presence check acknowledge frame to the management station X (step S236). The slave station B rewrites a part of the contents of the network presence check frame and repeats the network presence check frame from the second port B2 to the first port B1 (step S237). However, because the slave station C not in operation, a network presence check acknowledge frame from the slave station C is not output. The network presence check acknowledge frames transmitted by the slave stations A and B include link states of the ports checked by the link-state checking unit 66 before the transmission of the network presence check acknowledge frames.

The management station X that receives the network presence check acknowledge frame from the slave station B starts time measurement with the timer 21. In the case of this example, as explained above, because a network presence check acknowledge frame from the slave station C not in operation is not output, a predetermined time elapses after the network presence check acknowledge frame from the slave station B is received. The timer 21 times out (step S238). As a result, the network-presence-check processing unit 22 of the management station X recognizes that the slave station C (a slave station adjacent to the slave station B) withdraws from the network (step S239).

When the management station X receives the network presence check acknowledge frames from the slave stations A, B, and D, the management station X generates network connection information, which is a connection state among the communication nodes, at a point when the network presence check acknowledge frames are received.

Thereafter, the line-connection managing unit 24 of the management station X transmits, to the slave station B, a port control frame for disabling the first port B1 of the slave station B, which is a transmission source of a network presence check acknowledge frame received last (step S241). When the port-transmission/reception control unit 62 of the slave station B receives the port control frame, the port-transmission/reception control unit 62 performs processing for disabling the first port B1 according to contents of the port control frame (step S242). The control-frame acknowledging unit of the slave station B transmits, to the management station X, a port control acknowledge frame indicating that the disabling of the first port B1 is completed (step S243).

Thereafter, as explained in the first embodiment, the management station X determines token circulation order (step S251) and applies setup processing for setting transmission order for a token frame to the communication nodes (step S252). Thereafter, the management station X starts transmission processing for a data frame performed using the token frame in the network (step S253). At this point, the first port B1 of the slave station B to the second port D2 of the slave station D perform operations same as operations performed when the ports are not connected. Communication of the data frame is performed by the management station X and the slave stations A, B, and D excluding the slave station C.

Figure 16:
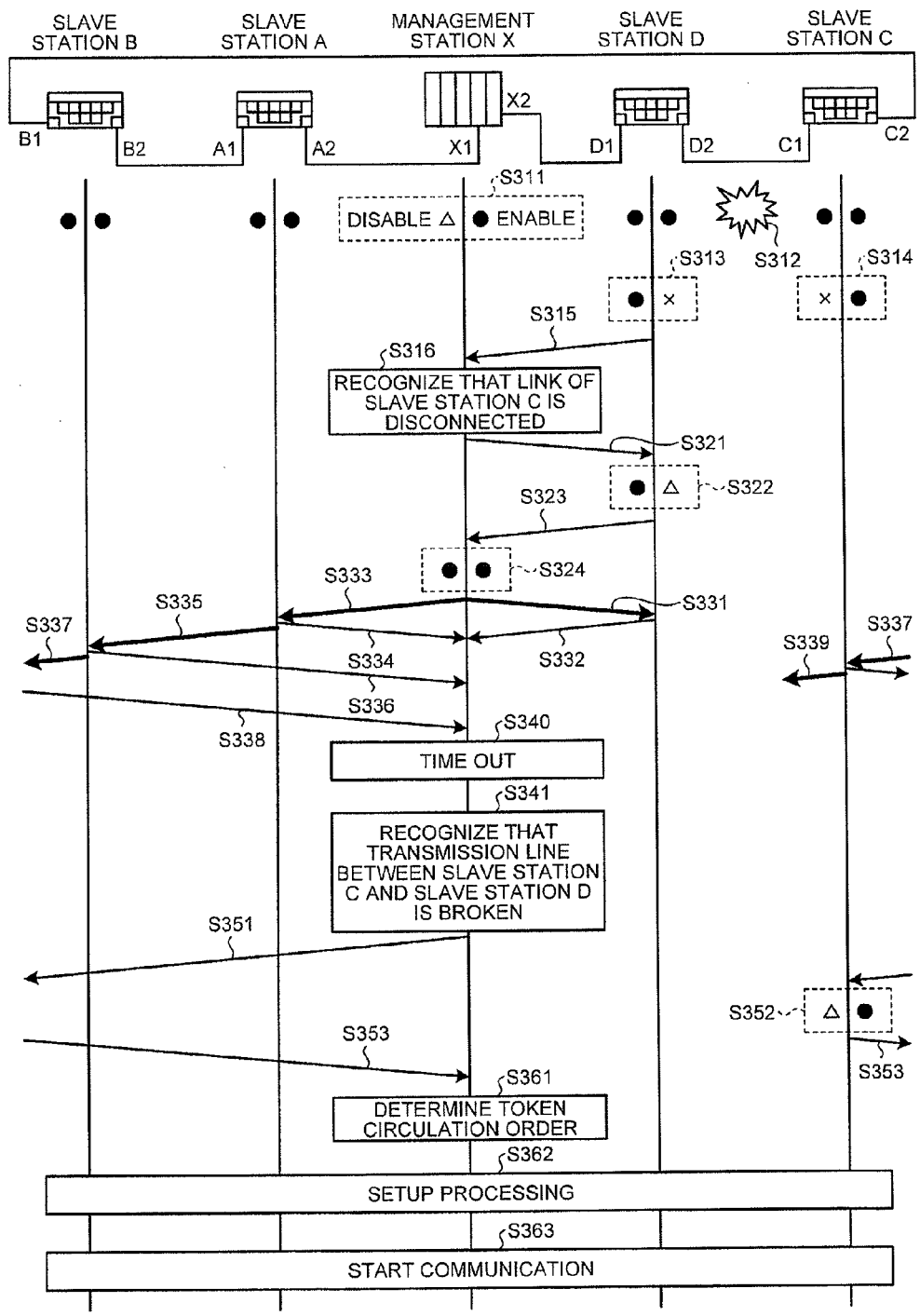
FIG. 16 is a sequence chart of an example of a procedure of ring reconfiguration processing performed when a cable is broken.

The ring reconfiguration processing performed when a node stops operating is explained above. However, when a cable is broken, ring reconfiguration processing is basically the same as the ring reconfiguration processing explained above. FIG. 16 is a sequence chart of an example of a procedure of the ring reconfiguration processing performed when a cable is broken. In FIG. 16, a configuration in which the four slave stations A to D are connected to the management station X in a ring shape is shown. However, this is an example. When an arbitrary number of slave stations are connected to the management station X, data communication can be performed by a method same as processing explained below.

First, it is assumed that, in this network, although the management station X and the slave stations A to D are connected by a cable in a ring shape, the first port X1 of the management station X is disabled (step S311), whereby transmission and reception of a data frame is performed in order of (1) described above using a token frame as line-type topology of the management station X, the slave station D, the slave station C, the slave station B, and the slave station A It is assumed that, immediately before the slave station D acquires a token frame, a cable between the slave station D and the slave station C is broken because of some cause (step S312). At this point, because a link check signal such as a link pulse periodically exchanged in a physical layer between the slave station D and a communication node adjacent to the slave station D is not obtained from the slave station C, the link-state checking unit 66 of the slave station D recognizes that a link of the slave station C is disconnected (i.e., the slave station C stops operating or a cable breaking occurs) (step S313). The link-state checking unit 66 of the slave station C also recognizes that the link of the slave station D is disconnected (i.e., the slave station D stops operating or a cable breaking occurs) (step S314).

Thereafter, when the slave station D acquires a token frame according to the token circulation order (1) decided in advance, the data-frame-communication processing unit 65 of the slave station D stores, in link state information in a data frame, information indicating that the link of the slave station C is disconnected and transmits the data frame to the management station X (step S315). Specifically, the data-frame-communication processing unit 65 stores, in the link state information of the data frame, indication that the first port D1 is normal but the second port D2 is abnormal and transmits the data frame to the management station X.

Subsequently, the management station X receives the data frame from the slave station D and performs normal reception processing. At this point, because the information indicating that the link of the slave station C is disconnected is included in the link state information, the line-connection managing unit 24 recognizes that the slave station C withdraws (step S316) and shifts to ring reconfiguration processing.

Therefore, first, the line-connection managing unit 24 of the management station X transmits, to the slave station D, a port control frame for disabling the second port D2 on the slave station C side of the slave station D that informs the withdrawal of the slave station C (step S321). When the port-transmission/reception control unit 62 of the slave station D receives the port control frame, the port-transmission/reception control unit 62 performs, according to contents of the port control frame, processing for disabling the second port D2 (step S322). The control-frame acknowledging unit 61 of the slave station D transmits, to the management station X, a port control acknowledge frame indicating that the disabling of the second port D2 is completed (step S323).

When the line-connection managing unit 24 of the management station X receives the port control acknowledge frame from the slave station D, the line-connection managing unit 24 enables the first port X1 of the own station (step S324). Consequently, both the first and second ports X1 and X2 of the management station X are enabled. Thereafter, the network-presence-check processing unit 22 of the management station X transmits a network presence check frame from the first and second ports X1 and X2 in broadcast (steps S331 and S333).

The network presence check frame transmitted from the second port X2 of the management station X is received by the slave station D. A network presence check acknowledge frame is returned from the slave station D (step S332). This network presence check acknowledge frame includes link states of the ports checked by the link-state checking unit 66 before the network presence check acknowledge frame is transmitted. In the slave station D, because the second port D2 is disabled, the received network presence check frame is not repeated to the slave station C connected beyond the second port D2 of the slave station D.

At this point, it is also conceivable that the cable between the slave station D and the slave station C is restored in a moment. In this case, in a transmission line between the second port D2 of the slave station D and the first port C1 of the slave station C, exchange of a link check signal is performed in a physical layer. However, in a data link layer, because the second port D2 of the slave station D is disabled, the network presence check frame is not repeated to the slave station C. Therefore, it is possible to prevent the slave station C from entering the network from the slave station D side in the ring reconfiguration processing. If the second port D2 of the slave station D is not disabled, the management station X and the slave stations A to D have a ring configuration. A frame permanently circulates in the network. Therefore, it is possible to prevent occurrence of such a situation by disabling the second port D2.

On the other hand, the network presence check frame transmitted from the first port X1 of the management station X is received by the slave station A. A network presence check acknowledge frame is returned from the slave station A to the management station X (step S334). The slave station A rewrites a part of contents of the network presence check frame and repeats the network presence check frame from the second port A2 to the first port A1 (step S335). Similarly, when the slave stations B and C receive the network presence check frame, the slave stations B and C transmit network presence check acknowledge frames to the management station X (steps S336 and S338). The slave stations B and C rewrite a part of contents of the network presence check frame and repeat the network presence check frame from the second ports to the first ports (steps S337 and S339). Because the cable between the slave station C and the slave station D is broken, the network presence check frame does not reach the slave station D. A network presence check acknowledge frame from the slave station D is not output. The network presence check acknowledge frames transmitted by the slave stations A, B, and C include link states of the ports checked by the link-state checking unit 66 before the transmission of the network presence check acknowledge frames.

The network-presence-check processing unit 22 of the management station X that receives the network presence check acknowledge frame from the slave station C starts time measurement with the timer 21. In the case of this example, as explained above, because the cable between the slave station C and the slave station D is broken, a network presence check acknowledge frame from the slave station D is not output. As a result, a predetermined time elapses after the network presence check acknowledge frame from the slave station C is received. The timer 21 times out (step S340). The line-connection managing unit 24 of the management station X recognizes, according to information in the network presence check acknowledge frames received till then, that the cable between the slave station C and the slave station D is broken (step S341).

When the management station X receives the network presence check acknowledge frames from the slave stations A to D, the management station X generates network connection information, which is a connection state among the communication nodes, at a point when the network presence check acknowledge frames are received.

Thereafter, the line-connection managing unit 24 transmits, to the slave station C, a port control frame for disabling the first port C1 of the slave station C from which a network presence check acknowledge frame is received last (step S351). When the port-transmission/reception control unit 62 of the slave station C receives the port control frame, the port-transmission/reception control unit 62 performs processing for disabling the first port C1 according to contents of the port control frame (step S352). The control-frame acknowledging unit 61 of the slave station C transmits, to the management station X, a port control acknowledge frame indicating that the disabling of the first port C1 is completed (step S353).

Thereafter, as explained in the first embodiment, the management station X determines token circulation order (step S361) and applies setup processing for setting transmission order for a token frame to the communication nodes (step S362). Thereafter, the management station X starts communication of a data frame performed using the token frame in the network (step S363). At this point, the communication of the data frame is performed in the management station X and the slave stations A to D same as those before the failure occurrence. However, a path connected linearly is different from that before the failure occurrence. In other word, the second port D2 of the slave station D to the first port C1 of the slave station C perform operations same as operations performed when the ports are not connected.

In the above explanation, the link states checked by the link-state checking unit 66 are stored in the data frame. However, the link states are not always stored in the data frame and can be stored in a token frame or other frames.

According to this third embodiment, when the token frame is received, the slave stations embed the link states of all the ports in the data frame and notifies the management station X of the link states. Consequently, when a communication node (a slave station) adjacent to a slave station that receives the token frame stops operating or a failure of a breaking of a cable occurs, it is possible to quickly notify the management station X of abnormality and perform the ring reconfiguration processing compared with waiting for a predetermined time to elapse after the token frame disappears in a section where the failure occurs. Because the network presence check frame is transmitted once, there is an effect that it is possible to realize a reduction in time of the ring reconfiguration processing.

When the ring reconfiguration processing is performed, a port of a communication node adjacent to a section where a failure occurs is disabled. Therefore, even when a cable state is an unstable state (a state in which states of a breaking of wire (abnormal) and live wire (normal) alternately change in a short time and a state in which a cable is nearly broken), it is possible to perform the ring reconfiguration processing in the ports excluding the section where the failure occurs. As a result, there is an effect that it is possible to prevent a situation in which, during the ring reconfiguration processing, all the communication nodes including a restored communication node and a communication node adjacent to a cable in an unstable cable state are enabled and a frame continues to flow in the network.

Fourth Embodiment.

The third embodiment is effective when a token frame is transmitted to a slave station adjacent to a section where a failure occurs. However, the third embodiment cannot be applied when a failure occurs in the slave station or a cable when the token frame is received or when a slave station on a path connecting the slave station that receives the token frame and the management station stops operation or the cable is broken. Therefore, in this fourth embodiment, ring reconfiguration processing in such a case is explained.

Figure 17:
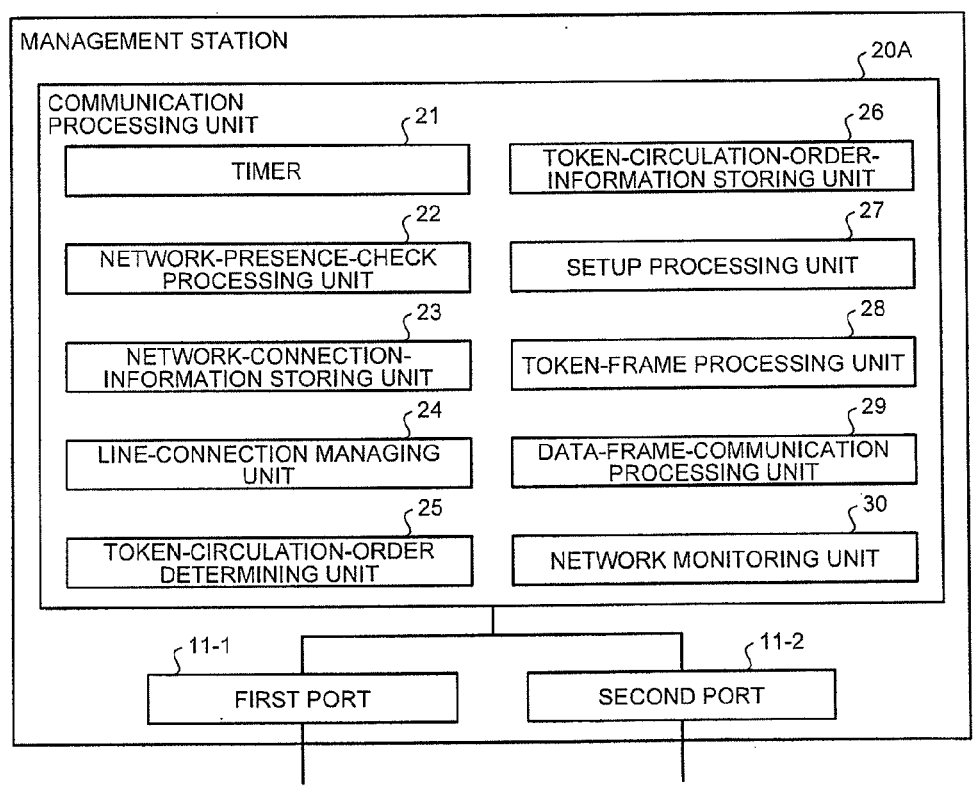
FIG. 17 is a schematic block diagram of an example of a functional configuration of a management station according to a fourth embodiment.

FIG. 17 is a schematic block diagram of an example of a functional configuration of a management station according to the fourth embodiment. The management station further includes, in the configuration shown in FIG. 2-1 in the first embodiment, a network monitoring unit 30 in the communication processing unit 20A.

When the network monitoring unit 30 detects a frame flowing in a network, the network monitoring unit 30 starts the timer 21 and monitors the frame flowing in the network. When the frame is input to the first port 11-1 or the second port 11-1 before a predetermined time elapses after the timer 21 is started, the network monitoring unit 30 resets the timer 21 and performs time measurement again. When the frame is not input to the first port 11-1 or the second port 11-2 before the predetermined time elapses after the timer 21 is started, i.e., when time-out is detected, the network monitoring unit 30 determines that the frame disappears in the network (a communication system) and instructs the network-presence check processing unit 22 to perform network presence check processing. All frames can be targets of the monitoring or a token frame can be a target of the monitoring.

Components same as those in the first embodiment are denoted by the same reference numerals and signs and explanation of the components is omitted. The configuration of slave stations used in this fourth embodiment is the same as the configuration explained in the first embodiment. Therefore, explanation of the configuration is omitted.

Figure 18:
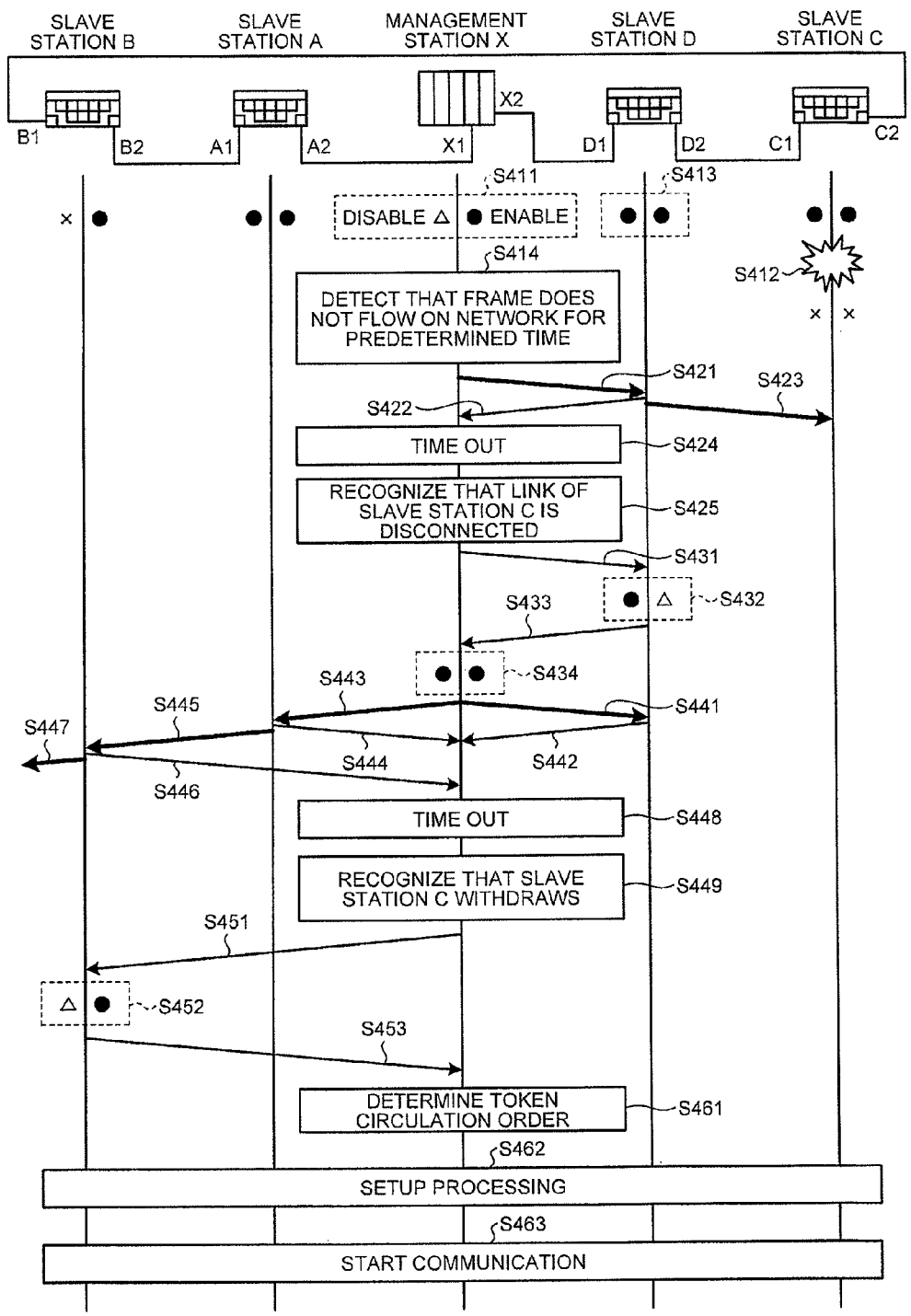
FIG. 18 is a sequence chart of an example of a procedure of ring reconfiguration processing performed when a communication node stops operating.

A data communication method according to this fourth embodiment is explained below. First, ring reconfiguration processing performed when a communication node in the network stops operating is explained. FIG. 18 is a sequence chart of an example of a procedure of the ring reconfiguration processing performed when a communication node stops operating. In FIG. 18, a configuration in which the four slave stations A to D are connected to the management station X in a ring shape is shown. However, this is an example. When an arbitrary number of slave stations are connected to the management station X, data communication can be performed by a method same as processing explained below.

First, it is assumed that, in this network, although the management station X and the slave stations A to D are connected by a cable in a ring shape, the first port X1 of the management station X is disabled (step S411), whereby transmission and reception of a data frame performed is performed in order of (1) described above using a token frame as linetype topology of the management station X, the slave station D, the slave station C, the slave station B, and the slave station A.

It is assumed that a power supply for the slave station C is turned off because of some cause after the slave station C acquires a token frame (step S412). At this point, the second port D2 of the slave station D changes to a state in which communication cannot be performed (step S413). In the slave station B, similarly, the first port B1 connected to the slave station C changes to a state in which communication cannot be performed.

When a token frame is circulated to the slave station C, the token frame flows to the entire network. Therefore, when the network monitoring unit 30 of the management station X detects that the token frame flows on the network, the network monitoring unit 30 sets the timer 21. Because the power supply for the slave station C that acquires the token frame is turned off, other frames do not flow on the network until the timer 21 times out.

When the network monitoring unit 30 of the management station X detects that a frame does not flow on the network for a predetermined time because of time-out (step S414), the network monitoring unit 30 recognizes that the token frame disappears on the network and instructs the network-presence-check processing unit 22 to perform network presence check processing. The network-presence-check processing unit 22 transmits a network presence check frame in broadcast while the present ports are kept enable and disabled, i.e., the first port X1 is kept disabled and the second port X2 is kept enabled (step S421).

The network presence check frame transmitted from the second port X2 of the management station X is received by the slave station D. A network presence check acknowledge frame is returned from the slave station D (step S422). The slave station D rewrites a part of contents of the network presence check frame and repeats the network presence check frame from the first port D1 to the second port D2 (step S423). However, because the slave station C is in a power-off state, a network presence check acknowledge frame is not returned from the slave station C connected beyond the second port D2 of the slave station D.

When the management station X receives the network presence check acknowledge frame from the slave station D, the management station X starts the timer 21 and starts time measurement of the predetermined time. However, because the power supply for the slave station C connected beyond the slave station D is in the off state, a network presence check acknowledge frame from the slave station C does not reach. As a result, the predetermined time elapses and time is out (step S424). Consequently, the network-presence-check processing unit 22 of the management station X recognizes that a link of the slave station C is disconnected, i.e., the data frame can be transmitted only up to the slave station D (step S425).

Thereafter, the line-connection managing unit 24 transmits, to the slave station D, a port control frame for disabling the second port D2 of the slave station D from which a network presence check acknowledge frame is received last (step S431). The port-transmission/reception control unit 62 of the slave station D that receives the port control frame performs, according to an instruction of the port control frame, processing for disabling the second port D2 to perform communication of a data frame in a data link layer and higher layers (step S432). When this disabling processing for the second port D2 ends, the control-frame acknowledging unit 61 transmits a port control acknowledge frame to the management station X (step S433).

In this series of processing, it is also conceivable that the slave station C is restored in a moment. In this case, in a transmission line between the second port D2 of the slave station D and the first port C1 of the slave station C, exchange of a link check signal is performed in a physical layer. However, in a data link layer, because the second port D2 of the slave station D is disabled, the network presence check frame is not repeated to the slave station C. Therefore, it is possible to prevent the slave station C, which operates unstably, from entering the network in the ring reconfiguration processing. If the second port D2 of the slave station D is not disabled, the management station X and the slave stations A to D have a ring configuration. A frame permanently circulates in the network. Therefore, it is possible to prevent occurrence of such a situation.

The line-connection managing unit 24 of the management station X that receives the port control acknowledge frame performs processing for enabling the first port X1 of the own station (step S434). Consequently, the management station X becomes capable of performing transmission and reception of a data frame in the two ports X1 and X2.

Subsequently, the network-presence-check processing unit 22 of the management station X transmits the network presence check frame to slave stations on a network in the same segment in broadcast (steps S441 and S443). The network presence check frame transmitted from the second port X2 is received by the slave station D. The slave station D transmits a network presence check acknowledge frame to the management station X (step S442). Because the second port D2 of the slave station D is disabled, repeat of the network presence check frame is not performed.

The network presence check frame transmitted from the first port X1 of the management station X is received by the slave station A. A network presence check acknowledge frame is returned from the slave station A (step S444). The slave station A rewrites a part of the contents of the network presence check frame and repeats the network presence check frame from the second port A2 to the first port A1 (step S445). Similarly, when the slave station B receives the network presence check frame, the slave station B transmits a network presence check acknowledge frame to the management station X (step S446). The slave station B rewrites a part of the contents of the network presence check frame and repeats the network presence check frame from the second port B2 to the first port B1 (step S447). However, because the slave station C is not in operation, the network presence check frame does not reach the slave station C. A network presence check acknowledge frame from the slave station C is not output.

The management station X that receives the network presence check acknowledge frame from the slave station B starts time measurement with the timer 21. In the case of this example, as explained above, because the slave station C is not in operation, a network presence check acknowledge frame from the slave station C is not output. Therefore, the predetermined time elapses after the network presence check acknowledge frame from the slave station B is received. The timer 21 times out (step S448). As a result, the line-connection managing unit 24 of the management station X recognizes that the slave station C (a slave station adjacent to the slave station B) withdraws from the network (step S449).

Thereafter, the line-connection managing unit 24 transmits, to the slave station B, a port control frame for disabling the first port B1 of the slave station B from which a network presence check acknowledge frame is received last (step S451). When the port-transmission/reception control unit 62 of the slave station B receives the port control frame, the port-transmission/reception control unit 62 performs, according to contents of the port control frame, processing for disabling the first port B1 (step S452). The control-frame acknowledging unit 61 of the slave station B transmits, to the management station X, a port control acknowledge frame indicating that the disabling of the first port B1 is completed (step S453).

When the management station X receives the network presence check acknowledge frames from the stations, the management station X generates network connection information, which is a connection state among the communication nodes, at a point when the network presence check acknowledge frames are received.

Thereafter, as explained in the first embodiment, the management station X determines token circulation order (step S461) and applies setup processing for setting transmission order for a token frame to the communication nodes A, B, and D (step S462). Transmission of a data frame performed using the token frame is started (step S463). At this point, communication of the data frame is performed by the management station X and the slave stations A, B, and D excluding the slave station C.

Figure 19:
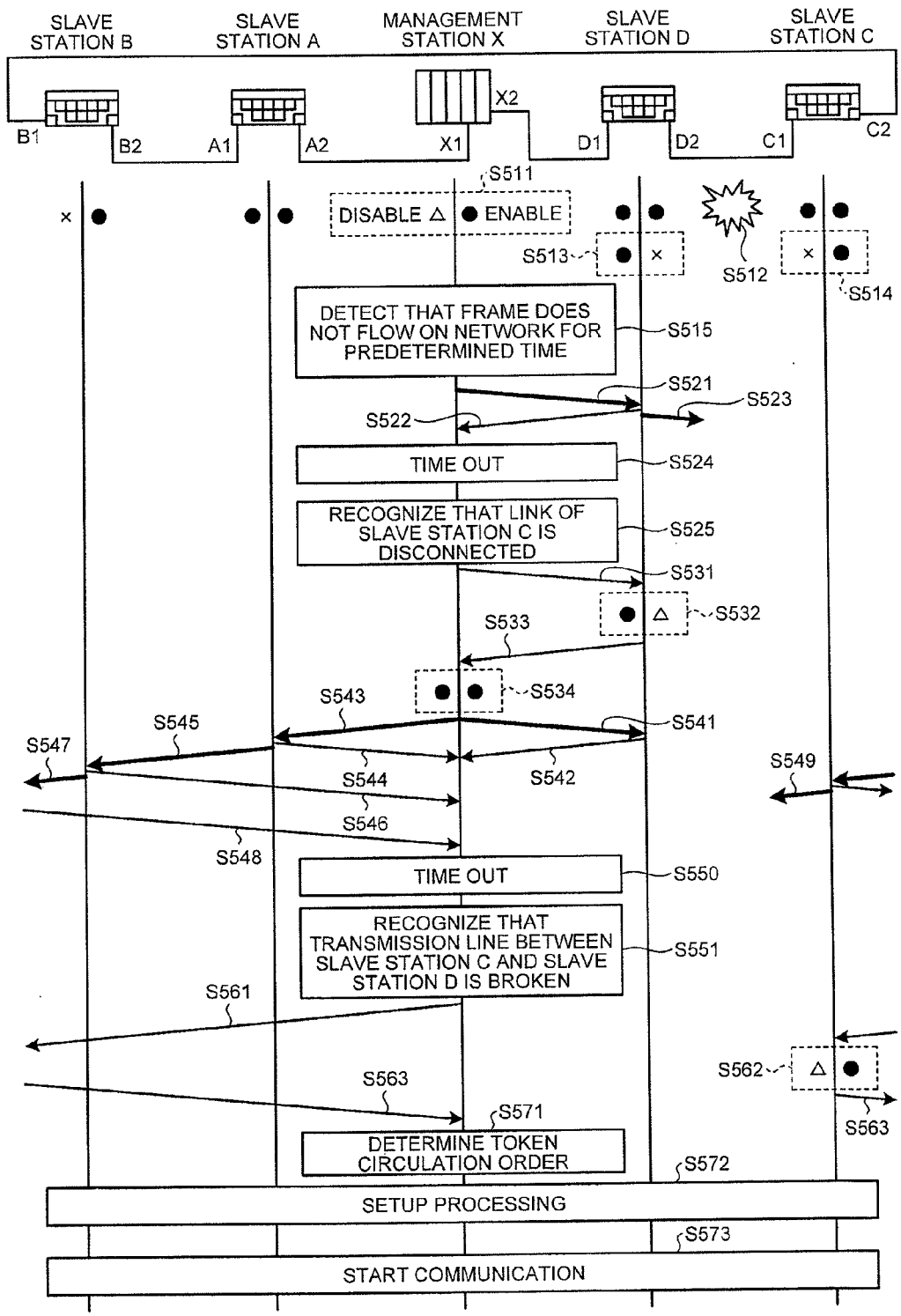
FIG. 19 is a sequence chart of an example of a procedure of ring reconfiguration processing performed when a cable is broken.

Ring reconfiguration processing performed when a cable is broken is explained below. The ring reconfiguration processing is basically the same as the ring reconfiguration processing performed when a communication node stops operation. FIG. 19 is a sequence chart of an example of a procedure of the ring reconfiguration processing performed when a cable is broken. In FIG. 19, a configuration in which the four slave stations A to D are connected to the management station X in a ring shape is shown. However, this is an example. When an arbitrary number of slave stations are connected to the management station X, data communication can be performed by a method same as processing explained below.

First, it is assumed that, in this network, although the management station X and the slave stations A to D are connected by a cable in a ring shape, the first port X1 of the management station X is disabled (step S511), whereby transmission and reception of a data frame is performed in order of (1) described above using a token frame as line-type topology of the management station X, the slave station D, the slave station C, the slave station B, and the slave station A.

It is assumed that, when any one of the slave stations A to C is acquiring a token frame, the cable between the slave station D and the slave station C is broken because of some cause (step S512). At this point, the second port D2 of the slave station D changes to a state in which communication cannot be performed (step S513). In the slave station B, similarly, the first port B1 connected to the slave station C also changes to a state in which communication cannot be performed (step S514). Further, when the network monitoring unit 30 of the management station X detects a frame that flows on the network last, the network monitoring unit 30 performs time measurement using the timer 21. Thereafter, because the cable is broken, a state in which other frames do not flow on the network continues for a predetermined time or more.

When the network monitoring unit 30 of the management station X detects that a frame does not flow on the network for the predetermined time because of time-out (step S515), the network monitoring unit 30 recognizes that the token frame disappears on the network and instructs the network-presence-check processing unit 22 to perform network presence check processing. The network-presence-check processing unit 22 transmits a network presence check frame in broadcast while the present ports are kept enabled and disabled, i.e., while the first port X1 is kept disabled and the second port X2 is kept enabled (step S521).

The network presence check frame transmitted from the second port X2 of the management station X is received by the slave station D. A network presence check acknowledge frame is returned from the slave station D (step S522). The slave station D rewrites a part of contents of the network presence check frame and repeats the network presence check frame from the first port D1 to the second port D2 (step S523). However, because the cable between the slave station D and the slave station C is broken, a network presence check acknowledge frame is not returned from the slave station C connected beyond the second port D2 of the slave station D.

When the management station X receives the network presence check acknowledge frame from the slave station D, the management station X starts the timer 21 and starts time measurement of the predetermined time. However, because the cable between the slave station D and the slave station C is broken, a network presence check acknowledge frame from the slave station C does not reach. As a result, the predetermined time elapses and time is out (step S524). The network-presence-check processing unit 22 of the management station X recognizes that a link of the slave station C is disconnected, i.e., the data frame can be transmitted up to only the slave station D (step S525).

Thereafter, the line-connection managing unit 24 transmits, to the slave station D, a port control frame for disabling the second port D2 of the slave station D from which a network presence check acknowledge frame is received last (step S531). The port-transmission/reception control unit 62 of the slave station D that receives the port control frame performs, according to the port control frame, processing for disabling the second port D2 to perform communication of a data frame in a data link layer and higher layers (step S532). When this disabling processing for the second port D2 ends, the control-frame acknowledging unit transmits a port control acknowledge frame to the management station X (step S533).

In this series of processing, it is also conceivable that the cable between the slave station C and the slave station D is restored in a moment. In this case, in a transmission line between the second port D2 of the slave station D and the first port C1 of the slave station C, exchange of a link check signal is performed in a physical layer. However, in a data link layer, because the second port D2 of the slave station D is disabled, the network presence check frame is not repeated to the slave station C. Therefore, it is possible to prevent the slave station C from entering the network in the ring reconfiguration processing of the second port X2 of the management station X. If the second port D2 is not disabled, the management station X and the slave stations A to D have a ring configuration. A frame flowing in the ring reconfiguration processing permanently circulates in the network. Therefore, it is possible to prevent occurrence of such a situation.

Thereafter, the line-connection managing unit 24 of the management station X that receives the port control acknowledge frame performs processing for enabling the first port X1 of the own station (step S534). Consequently, the management station X becomes capable of performing transmission and reception of a data frame in the two ports X1 and X2.

Subsequently, the network-presence-check processing unit 22 transmits the network presence check frame to slave stations on a network in the same segment in broadcast (steps S541 and S543). Processing concerning the network presence check frame transmitted from the second port X2 of the management station X is the same as steps S441 and S442 in FIG. 18 explained above (steps S541 and S542).

The network presence check frame transmitted from the first port X1 of the management station X is received by the slave station A. A network presence check acknowledge frame is returned from the slave station A (step S544). The slave station A rewrites a part of the contents of the network presence check frame and repeats the network presence check frame from the second port A2 to the first port A1 (step S545). Similarly, when the slave stations B and C receive the network presence check frame, the slave stations B and C transmit network presence check acknowledge frames to the management station X (steps S546 and S548). The slave stations B and C rewrite a part of the contents of the network presence check frame and repeat the network presence check frame from the second ports to the first ports (steps S547 and S549). Because the cable between the slave station C and the slave station D is broken, the network presence check frame does not reach the slave station D. A network presence check acknowledge frame from the slave station D is not output.

The network-presence-check processing unit 22 of the management station X that receives the network presence check acknowledge frame from the slave station C starts time measurement with the timer 21. In the case of this example, as explained above, because the cable between the slave station C and the slave station D is broken, a network presence check acknowledge frame from the slave station D is not output. As a result, the predetermined time elapses after the network presence check acknowledge frame from the slave station C is received. The timer 21 times out (step S550). The line-connection managing unit 24 of the management station X recognizes, from information in the network presence check acknowledge frames received till then, that the cable between the slave station C and the slave station D is broken (step S551).

When the management station X receives the network presence check acknowledge frames from the stations, the management station X generates network connection information, which is a connection state among the communication nodes, at a point when the network presence check acknowledge frames are received.

Thereafter, the line-connection managing unit 24 transmits, to the slave station C, a port control frame for disabling the first port C1 of the slave station C, from which a network presence check acknowledge frame is received last (step S561). When the port-transmission/reception control unit 62 of the slave station C receives the port control frame, the port-transmission/reception control unit 62 performs processing for disabling the first port C1 according to contents of the port control frame (step S562). The control-frame acknowledging unit 61 of the slave station C transmits, to the management station X, a port control acknowledge frame indicating that the disabling of the first port C1 is completed (step S563).

Thereafter, as explained in the first embodiment, the management station X determines token circulation order (step S571) and applies setup processing for setting transmission order for a token frame to the communication nodes A to D (step S572). Thereafter, communication processing for a data frame performed using the token frame is started (step S573). At this point, the communication of the data frame is performed in the management station X and the slave stations A to D same as those before the failure occurrence. However, a path connected linearly is different from that before the failure occurrence. In other word, the second port D2 of the slave station D to the first port C1 of the slave station C perform operations same as operations performed when the ports are not connected.

In the above explanation, the network monitoring unit 30 is provided in the management station X in the case of the first embodiment. However, the network monitoring unit 30 can be provided in the management station X in the case of the second and third embodiments.

According to this fourth embodiment, when the management station X does not detect the next frame within the predetermined time after the management station X detects a frame last, the management station X regards that abnormality occurs in the network and performs the network presence check processing (the ring reconfiguration processing). Consequently, there is an effect that it is also possible to detect disappearance of a token frame other than when a communication node adjacent to a section where a failure occurs obtains a transmission right. Even when power supplies for the communication nodes in the network repeat turn-on and turn-off in a short period or a power supply for a communication node once turned off is immediately turned on again, a port of a slave station adjacent to an unstable communication node is disabled during the network presence check processing. Therefore, there is an effect that it is possible to perform recovery while preventing occurrence of a frame storm in which a frame continues to flow in a network connected in a ring shape.

When the ring reconfiguration processing is performed, a port of a communication node adjacent to a section where a failure occurs is disabled. Therefore, even when a communication node in which a failure occurs during the ring reconfiguration processing is restored, a cable state is an unstable state (a state in which states of a breaking of wire (abnormal) and live wire (normal) alternately change in a short time and a state in which a cable is nearly broken), it is possible to perform the ring reconfiguration processing in the ports excluding the section where the failure occurs. As a result, there is an effect that it is possible to prevent a situation in which, during the ring reconfiguration processing, all the communication nodes including a restored communication node and a communication node adjacent to a cable in an unstable cable state are enabled and a frame continues to flow in the network.

Fifth Embodiment.

In the third and fourth embodiments, the ring reconfiguration processing performed when a communication node (a slave station) in the network withdraws from the network because of some cause is explained. In this fifth embodiment, conversely, network presence check processing performed when a withdrawn communication node (slave station) is restored is explained.

The configurations of a management station and slave stations in the fifth embodiment are the same as those explained in the second and third embodiments.

Figure 20:
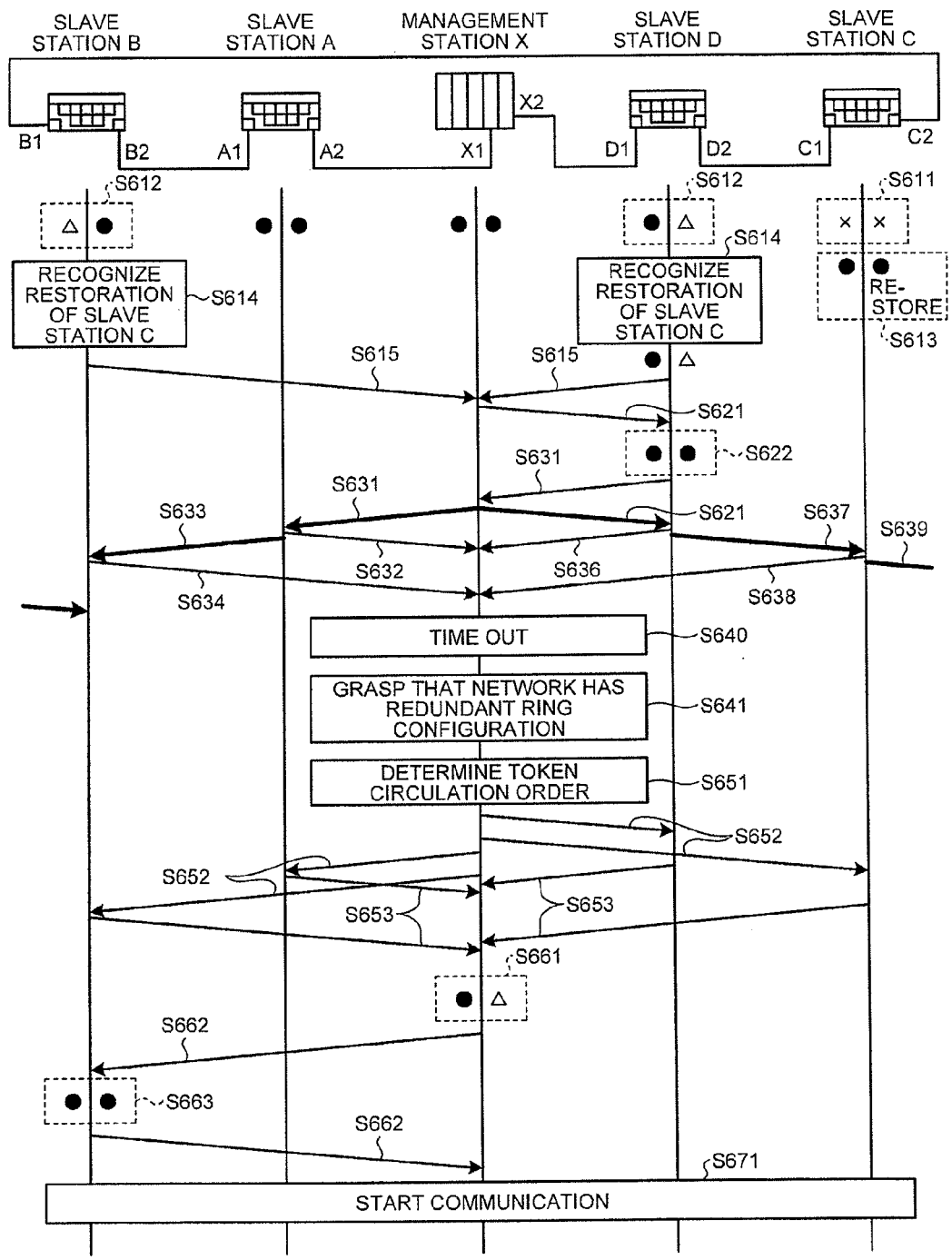
FIG. 20 is a sequence chart of an example of a processing procedure of a data communication method performed when a slave station is restored.

FIG. 20 is a sequence chart of an example of a processing procedure of a data communication method performed when a slave station is restored. In FIG. 20, a configuration in which the four slave stations A to D are connected to the management station X in a ring shape is shown. However, this is an example. When an arbitrary number of slave stations are connected to the management station X, data communication can be performed by a method same as processing explained below.

First, it is assumed that, in this network, although the management station X and the slave stations A to D are connected by a cable in a ring shape, the slave station C is in a power-off state because of a failure (step S611) and transmission and reception of a data frame is performed using a token frame between the management station X and the slave stations A, B, and D. Specifically, the first port B1 of the slave station B is disabled, the second port B2 of the slave station B is enabled, the first port D1 of the slave station D is enabled, and the second port D2 of the slave station D is disabled. These slave stations B and D are communication nodes at the end (step S612).

It is assumed that, before the slave station D or the slave station B acquires a token frame, the slave station C is restored and the power supply is turned on (step S613). At this point, because a link check signal such as a link pulse periodically exchanged in a physical layer between the slave station D or B and a communication node adjacent to the slave station D or B is obtained from the slave station C, the link-state checking unit 66 of the slave station D or B recognizes that the slave station C is restored from the power-off state (step S614).

Thereafter, the slave station D or the slave station B acquires a token frame according to token circulation order decided in advance and transmits a data frame. At this point, the data-frame-communication processing unit 65 stores, in link state information in the data frame, information indicating that the slave station C is restored (step S615). Specifically, when the slave station D or B acquires a token, the data-frame-communication processing unit 65 stores, in the link state information of the data frame, indication that the first and second ports are normal and transmits the data frame to the management station X.

Subsequently, the management station X receives the data frame from the slave station D or the slave station B and performs normal reception processing. At this point, because the information indicating that the slave station C is restored is included in the link state information, the line-connection managing unit 24 recognizes that the slave station C is restored. In the following explanation, the slave station D acquires the token frame and notifies the management station X of the restoration of the slave station C.

The line-connection managing unit 24 of the management station X transmits, to the slave station D, a port control frame for enabling the second port D2 on the slave station C side of the slave station D that informs the restoration of the slave station C (step S621). When the port-transmission/reception control unit 62 of the slave station D receives the port control frame, the port-transmission/reception control unit 62 performs, according to contents of the port control frame, processing for enabling the second port D2 (step S622). The control-frame acknowledging unit 61 of the slave station D transmits, to the management station X, a port control acknowledge frame indicating that the enabling of the second port D2 is completed (step S623).

When the network-presence-check processing unit of the management station X receives the port control acknowledge frame from the slave station D, the network-presence-check processing unit transmits a network presence check frame from the first and second ports X1 and X2 in broadcast (steps S631 and S635).

The network presence check frame transmitted from the first port X1 of the management station X is received by the slave station A. A network presence check acknowledge frame is returned from the slave station A (step S632). The slave station A rewrites a part of contents of the network presence check frame and repeats the network presence check frame from the second port A2 to the first port A1 (step S633). When the slave station B receives the network presence check frame, the slave station B also transmits a network presence check acknowledge frame to the management station X (step S634). However, because the first port B1 of the slave station B is disabled, the network presence check frame is not repeated. The network presence check acknowledge frames transmitted from the slave stations A and B include link states of the ports checked by the link-state checking unit 66 before the network presence check acknowledge frames are transmitted.

On the other hand, the network presence check frame transmitted from the second port X2 of the management station X is received by the slave station D. A network presence check acknowledge frame is returned from the slave station D (step S636). The slave station D rewrites a part of the contents of the network presence check frame and repeats the network presence check frame from the first port D1 to the second port D2 (step S637). Similarly, when the slave station C receives the network presence check frame, the slave station C transmits a network presence check acknowledge frame to the management station X (step S638). The slave station C rewrites a part of the contents of the network presence check frame and repeats the network presence check frame from the first port C1 to the second port C2 (step S639). However, because the first port B1 of the slave station B is disabled, the received network presence check frame does not reach the slave station B. The network presence check acknowledge frames transmitted from the slave stations C and D include link states of the ports checked by the link-state checking unit 66 before the network presence check acknowledge frames are transmitted.

When the network-presence-check processing unit 22 of the management station receives the network presence check acknowledge frame, the network-presence-check processing unit 22 starts the timer 21 and determines whether a network presence check acknowledge frame is received within a predetermined time. When a network presence check acknowledge frame is received within the predetermined time, the network-presence-check processing unit 22 resets the timer 21 and performs time measurement again. Because another slave station is not connected beyond the slave station C (because the first port B1 of the slave station B after the slave station C is disabled), when the network-presence-check processing unit 22 receives a network presence check acknowledge frame from the slave station C and resets the timer, time is out (S640).

Every time the network-presence-check processing unit 22 receives the network presence check acknowledge frame from the slave stations A to D, as explained in the first embodiment, the network-presence-check processing unit 22 generates network connection information and stores the network connection information in the network-connection-information storing unit 23. At this point, when link state information from all the slave stations A to D is normal, the management station X grasps that a network configuration is a redundant ring configuration (step S641).

Thereafter, the token-circulation-order determining unit 25 of the management station X determines token circulation order using the network connection information (step S651) and stores the token circulation order in the token-circulation-order-information storing unit 26. Subsequently, the setup processing unit 27 of the management station X generates, using the token circulation order stored in the token-circulation-order-information storing unit 26, a setup frame for notifying token circulation destination information of the communication nodes and transmits the setup frame to the slave stations A to D (step S652). Thereafter, the control-frame acknowledging units 61 of the slave stations A to D generate setup acknowledge frames corresponding to the received setup frame and transmit the setup acknowledge frames to the management station X (step S653).

Subsequently, the management station X receives the setup acknowledge frames from all the slave stations A to D and recognizes that the setup frame issued by the management station X normally reaches the slave stations A to D. The line-connection managing unit 24 disables the second port X2 of the own station (the management station) (step S661) and transmits a port control frame for enabling the first port B1 of the slave station B (step S662). Thereafter, when the port-transmission/reception control unit 62 of the slave station B receives the port control frame, the port-transmission/reception control unit 62 performs, according to contents of the port control frame, processing for enabling the first port B1 (step S663). Further, the control-frame acknowledging unit of the slave station B transmits, to the management station X, a port control acknowledge frame indicating that the enabling of the first port B1 is completed (step S664). The management station X starts communication performed using the token frame (step S671).

In the above explanation, the processing during the power supply restoration for the slave station is explained. However, the processing can be performed in the same manner during cable restoration.

According to this fifth embodiment, there is an effect that, when a slave station withdrawn from the network because of some cause is restored, it is possible to quickly detect the restoration and perform the network presence check processing.

Sixth Embodiment.

Figure 21:
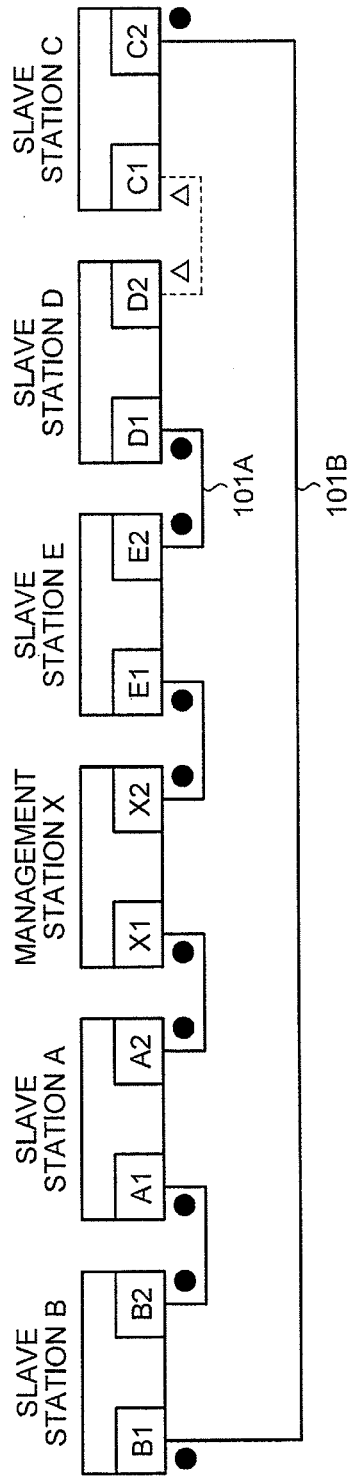
FIG. 21 is a diagram of a state during transmission of a data frame by a token system.

FIG. 21 is a diagram of a state during transmission of a data frame by a token system. In FIG. 21, one management station X and five slave stations A to E are connected by a transmission line in a ring shape. The first port C1 of the slave station C and the second port D2 of the slave station D are disabled. The management station X and the slave stations A to E perform transmission and reception of a data frame in a line-type network.

Figure 22:
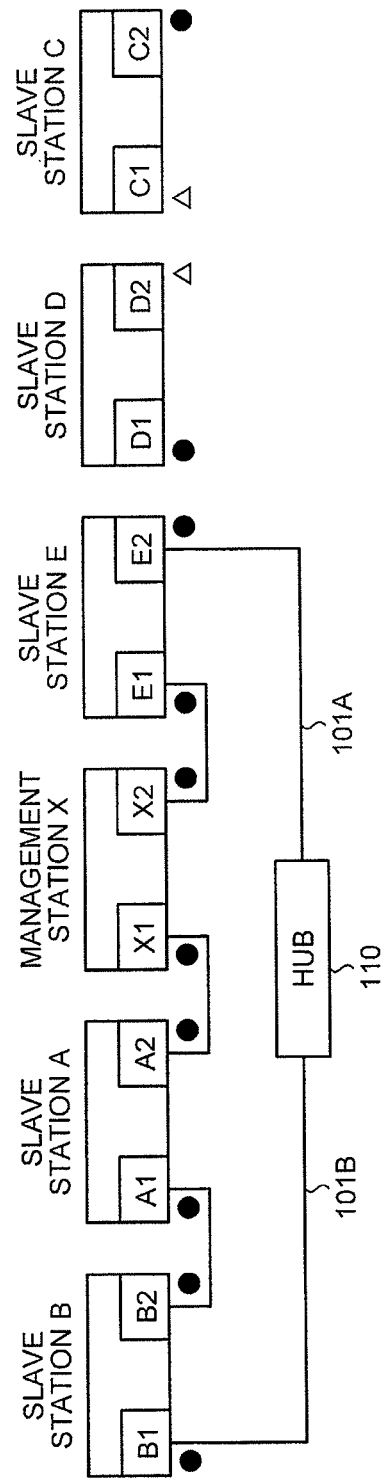
FIG. 22 is a schematic diagram of a state in which connection of a cable is changed from the state shown in FIG. 21.

FIG. 22 is a schematic diagram of a state in which connection of a cable is changed from the state shown in FIG. 21. In FIG. 22, a cable 101A connected to the first port D1 of the slave station D and a cable 101B connected to the second port C2 of the slave station C are simultaneously and quickly switched to ports respectively having different hubs 110 from the state shown in FIG. 21. As such a case, for example, the switching of the cables 101A and 101B is completed before it is detected according to a link check signal that the cables are detached or the switching of the cables 101A and 101B is detected by the link check signal disappears halfway in a path to the management station X. In the network state shown in FIG. 21, a second port E2 of the slave station E and the first port B1 of the slave station B are enabled. Therefore, in FIG.

22, the second port E2 of the slave station E and the first port B1 of the slave station B are also enabled. As a result, the network changes to ring-type topology. A frame storm in which the same frame continues to circulate in a ring-type transmission line occurs.

Such a frame storm is a state in which, even when a token frame disappears and time-out occurs or when a token frame is received, a frame transmitted to the management station X is present. In such a state, because the transmission line is always in use, the network does not function. Therefore, in this sixth embodiment, a communication system applicable even in such a frame storm state is explained.

The management station X in this sixth embodiment has a configuration same as that shown in FIG. 17. However, a function of monitoring occurrence of a frame storm state is given to the network monitoring unit 30. A function of stopping a repeat function between the first and second ports 11-1 and 11-2 when occurrence of a frame storm is detected by the network monitoring unit 30 is given to the line-connection managing unit 24. The network monitoring unit 30 also has a function of notifying, when the network monitoring unit 30 confirms that no frame is transmitted to the management station for a predetermined time after the repeat function between the first and second ports 11-1 and 11-2 is stopped, the line-connection managing unit 24 and the network-presence-check processing unit 22 to that effect. When a notification to the effect that the frame storm is over is received from the network monitoring unit 30, the line-connection managing unit 24 releases the stop of the repeat function between the first and second ports 11-1 and 11-2 and the network-presence-check processing unit 22 starts network presence check processing. Because the other components are the same as those in the embodiments explained above, explanation of the components is omitted.

A procedure of frame storm prevention processing according to the sixth embodiment is explained below. First, as shown in FIG. 22, all the ports of all the communication nodes change to ring-type topology in an enabled state from the state shown in FIG. 21 according to switching of the cables 101A and 101B. Thereafter, even if time-out of token frame disappearance occurs or even if a token frame is received, the network monitoring unit 30 of the management station X recognizes that the frame storm state occurs.

Thereafter, when occurrence of the frame storm state is detected by the network monitoring unit 30, the line-connection managing unit 24 stops the repeat function between the first port X1 and the second port X2.

Thereafter, when the network monitoring unit 30 confirms that a frame transmitted to the management station X is absent for a predetermined time, the line-connection managing unit 24 releases the stop of the repeat function between the first port X1 and the second port X2 and the network-presence-check processing unit 22 performs the network presence check processing. The network presence check processing is performed in a procedure explained in the first and second embodiments. Therefore, explanation of details of the network presence check processing is omitted.

According to this sixth embodiment, switching of cables is quickly performed to prevent a disabled port from being present in the network. There is an effect that it is possible to return the network to a normal state even when a frame storm occurs.

INDUSTRIAL APPLICABILITY

As explained above, the communication system according to the present invention is useful when the communication system performs communication as a network connected linearly among communication nodes connected in a ring shape by a transmission line.

REFERENCE SIGNS LIST 11-1, 11-2, 51-1, 51-2 PORTS
20, 20A, 60, 60A COMMUNICATION PROCESSING UNITS
21 TIMER
22 NETWORK-PRESENCE-CHECK PROCESSING UNIT
23 NETWORK-CONNECTION-INFORMATION STORING UNIT
24 LINE-CONNECTION MANAGING UNIT
25 TOKEN-CIRCULATION-ORDER DETERMINING UNIT
26 TOKEN-CIRCULATION-ORDER-INFORMATION STORING UNIT
27 SETUP PROCESSING UNIT
28, 64 TOKEN-FRAME PROCESSING UNITS
29, 65 DATA-FRAME-COMMUNICATION PROCESSING UNITS
30 NETWORK MONITORING UNIT
61 CONTROL-FRAME ACKNOWLEDGING UNIT
62 PORT-TRANSMISSION/RECEPTION CONTROL UNIT
63 TOKEN-CIRCULATION-DESTINATION-INFORMATION STORING UNIT
66 LINK-STATE CHECKING UNIT
101 TRANSMISSION LINE
101A, 101B CABLES
110 HUB
A, B, C, D SLAVE STATIONS
X MANAGEMENT STATION

The invention claimed is:
1. A communication management apparatus that manages transmission of data in a token passing system in a network in which a plurality of communication nodes are connected via a transmission line in a ring shape, the communication management apparatus comprising:
  two ports connected to, via the transmission line, the communication nodes adjacent to the communication management apparatus;
  a line-connection managing unit that gives an instruction for switching a port of any one of the communication nodes on the network including the own apparatus to a disabled state in which frame transmission and reception is impossible and an enabled state in which frame transmission and reception is possible;
  a network-presence checking unit that transmits, in broadcast, a network presence check frame for recognizing the communication node present in the network, receives a network presence check acknowledge frame including a relation between a communication node adjacent to the communication node and ports of the communication node, and performs network presence check processing for generating network connection information indicating a connection state between the communication nodes;
  a token-circulation-order determining unit that determines token circulation order using the network connection information;
  a setup processing unit that performs, based on the token circulation order, setup processing for notifying each of the communication nodes in the network of a commu- nication node to which the transmission right is granted after the communication node; and a data-frame-communication processing unit that performs transmission and reception of a data frame using a token frame, wherein when the line-connection managing unit recognizes, according to the network connection information, that the network has a ring configuration, the line-connection managing unit disables any one of ports of any one of the communication nodes in the network to prevent a connection state of the network from becoming a ring shape, and wherein the network presence check acknowledge frame includes a link state that is normal in a state in which another communication node is communicably connected via the transmission line to a communication node that transmits the frame and is abnormal in a state in which another communication node is not connected to the communication node, and the network-presence checking unit generates the network connection information using the network presence check acknowledge frame obtained by transmitting the network presence check frame in broadcast from an enabled port of the own apparatus at a point of execution of the network presence check processing and, when the link states of received all the network presence check acknowledge frames are normal, recognizes that the network has the ring configuration, and wherein the data frame includes a link state that is normal in a state in which another communication node is connected via the transmission line to a communication node that transmits the frame and is abnormal in a state in which another communication node is not connected to the communication node, and when the line-connection managing unit receives, during data frame transmission and reception, a data frame, the link state of which is abnormal, from a communication node, the link state of which should be normal according to the network connection information, after transmitting a first port control frame for disabling a port, the link state of which is abnormal, of the communication node that transmits the data frame, the line-connection managing unit performs switching of the ports of the own apparatus to generate network connection information for acquiring the other communication node adjacent to an abnormal section and thereafter transmits a second port control frame for disabling a port in an unconnected state of a communication node that is at an end in the generated network connection information.

2. The communication management apparatus according to claim 1, further comprising a frame monitoring unit that monitors a state in which a frame does not flow in the network for a predetermined time, wherein the network-presence-check processing unit has a function of performing the network presence check processing even when the frame monitoring unit detects that a frame does not flow in the network for the predetermined time during data frame transmission and reception, and the line-connection managing unit transmits, using new network connection information obtained by the network presence check processing after the detection, a port control frame for disabling a port in an unconnected state of a communication node adjacent to the abnormal section.

3. A communication management apparatus that manages transmission of data in a token passing system in a network in which a plurality of communication nodes are connected via a transmission line in a ring shape, the communication management apparatus comprising:

two ports connected to, via the transmission line, the communication nodes adjacent to the communication management apparatus;

a line-connection managing unit that gives an instruction for switching a port of any one of the communication nodes on the network including the own apparatus to a disabled state in which frame transmission and reception is impossible and an enabled state in which frame transmission and reception is possible;

a network-presence checking unit that transmits, in broadcast, a network presence check frame for recognizing the communication node present in the network, receives a network presence check acknowledge frame including a relation between a communication node adjacent to the communication node and ports of the communication node, and performs network presence check processing for generating network connection information indicating a connection state between the communication nodes;

a token-circulation-order determining unit that determines token circulation order using the network connection information;

a setup processing unit that performs, based on the token circulation order, setup processing for notifying each of the communication nodes in the network of a communication node to which the transmission right is granted after the communication node; and a data-frame-communication processing unit that performs transmission and reception of a data frame using a token frame, wherein when the line-connection managing unit recognizes, according to the network connection information, that the network has a ring configuration, the line-connection managing unit disables any one of ports of any one of the communication nodes in the network to prevent a connection state of the network from becoming a ring shape, and wherein the network presence check acknowledge frame includes a link state that is normal in a state in which another communication node is communicably connected via the transmission line to a communication node that transmits the frame and is abnormal in a state in which another communication node is not connected to the communication node, and the network-presence checking unit generates the network connection information using the network presence check acknowledge frame obtained by transmitting the network presence check frame in broadcast from an enabled port of the own apparatus at a point of execution of the network presence check processing and, when the link states of received all the network presence check acknowledge frames are normal, recognizes that the network has the ring configuration, and wherein the data frame includes a link state that is normal in a state in which another communication node is connected via the transmission line to a communication node that transmits the frame and is abnormal in a state in which another communication node is not connected to the communication node, and when the line-connection managing unit receives, during data frame transmission and reception, a data frame, the link state of which is normal, from a communication node, the link state of which should be abnormal according to the network connection information, the line-connection managing unit transmits a first port control frame for enabling a disabled port of the communication node, which transmits the data frame, and performs switching of enabling and disabling of the ports of the communication nodes in the network using new network connection information generated by the network-presence checking unit after the first port control frame transmission.

4. The communication management apparatus according to claim 3, wherein, when the line-connection managing unit recognizes from the new network connection information that the network has the ring configuration, the line-connection managing unit disables a port of the own apparatus from which the first port control frame is transmitted and transmits a second port control frame for enabling the disabled port to a communication node having the disabled port.

5. A communication management apparatus that manages transmission of data in a token passing system in a network in which a plurality of communication nodes are connected via a transmission line in a ring shape, the communication management apparatus comprising:
two ports connected to, via the transmission line, the communication nodes adjacent to the communication management apparatus;
a line-connection managing unit that gives an instruction for switching a port of any one of the communication nodes on the network including the own apparatus to a disabled state in which frame transmission and reception is impossible and an enabled state in which frame transmission and reception is possible;
a network-presence checking unit that transmits, in broadcast, a network presence check frame for recognizing the communication node present in the network, receives a network presence check acknowledge frame including a relation between a communication node adjacent to the communication node and ports of the communication node, and performs network presence check processing for generating network connection information indicating a connection state between the communication nodes;
a token-circulation-order determining unit that determines token circulation order using the network connection information;
a setup processing unit that performs, based on the token circulation order, setup processing for notifying each of the communication nodes in the network of a communication node to which the transmission right is granted after the communication node; and
a data-frame-communication processing unit that performs transmission and reception of a data frame using a token frame, wherein
when the line-connection managing unit recognizes, according to the network connection information, that the network has a ring configuration, the line-connection managing unit disables any one of ports of any one of the communication nodes in the network to prevent a connection state of the network from becoming a ring shape and wherein
the communication management apparatus further comprises a frame monitoring unit that monitors a frame flowing in the network and monitors a frame storm state in which a frame transmitted to the own apparatus is present even after the token frame disappears and time-out occurs or after the token frame is received, wherein
when the frame monitoring unit detects the frame storm state, the line-connection managing unit stops a repeat function for a frame between the two ports.

6. A data communication method for a plurality of communication nodes in a communication system including: a communication management apparatus including two ports that manages transmission of data in a token passing system in a network in which the communication nodes are connected via a transmission line in a ring shape and is one of the communication nodes; and a slave station that is another communication node in the network, the data communication method comprising:
the communication management apparatus transmitting, in broadcast, a network presence check frame for recognizing the communication node present in the network while including, in the frame, port information of a port from which the frame is transmitted;
the slave station transmitting, to the communication management apparatus, when the network presence check frame is received, a network presence check acknowledge frame including a relation between a communication node adjacent to the own station and ports of the communication node and repeating the received network presence check frame;
the communication management apparatus generating network connection information indicating a connection state between the communication nodes from the relation between the communication node adjacent to the slave station, which transmits the network presence check acknowledge frame, and the ports of the communication node included in the received network presence check acknowledge frame;
the communication management apparatus determining token circulation order based on the network connection information and notifying the slave station of token circulation destination information including a communication node to which a transmission right is granted next; and
performing transmission of a data frame using the token frame, wherein
in the transmitting the network presence check frame, the communication management apparatus performs, before transmitting the network presence check frame, processing for changing any one of ports of the communication nodes on the network to a disabled state in which frame transmission and reception is impossible, wherein
in the performing the transmission of the data frame, when a state in which the data frame does not flow in the network for a predetermined time is detected, to generate new network connection information, the communication management apparatus performs processing from the transmitting the network presence check frame to the generating the network connection information, and
the data communication method further comprises the communication management apparatus acquiring, from the new network connection information, a slave station at an end connected to the two ports and disabling an unconnected port of the slave station.

7. The data communication method according to claim 6, wherein, in the performing the transmission of the data frame, when the state in which the data frame does not flow in the network for the predetermined time occurs because of power-off of a slave station on the network,
in the disabling the unconnected port, the communication managing apparatus disables a port of a slave station connected to the powered-off slave station via the transmission line.

8. The data communication method according to claim 6, wherein, in the performing the transmission of the data frame, when the state in which the data frame does not flow in the network for the predetermined time occurs because of a breaking of wire of a transmission line on the network,
in the disabling the unconnected port, the communication managing apparatus disables ports of slave stations connected to both ends of the broken transmission line.

9. A data communication method for a plurality of communication nodes in a communication system including: a communication management apparatus including two ports that manages transmission of data in a token passing system in a network in which the communication nodes are connected via a transmission line in a ring shape and is one of the communication nodes; and a slave station that is another communication node in the network, the data communication method comprising:
the communication management apparatus transmitting, in broadcast, a network presence check frame for recognizing the communication node present in the network while including, in the frame, port information of a port from which the frame is transmitted;
the slave station transmitting, to the communication management apparatus, when the network presence check frame is received, a network presence check acknowledge frame including a relation between a communication node adjacent to the own station and ports of the communication node and repeating the received network presence check frame;
the communication management apparatus generating network connection information indicating a connection state between the communication nodes from the relation between the communication node adjacent to the slave station, which transmits the network presence check acknowledge frame, and the ports of the communication node included in the received network presence check acknowledge frame;
the communication management apparatus determining token circulation order based on the network connection information and notifying the slave station of token circulation destination information including a communication node to which a transmission right is granted next; and performing transmission of a data frame using the token frame, wherein
in the transmitting the network presence check frame, the communication management apparatus performs, before transmitting the network presence check frame, processing for changing any one of ports of the communication nodes on the network to a disabled state in which frame transmission and reception is impossible, wherein
the communication method further comprises the slave station checking a link state that is normal in a state in which another communication node is communicably connected to a port of the own station and is abnormal in a state in which another communication node is not connected to the port of the own station, and wherein
in the transmitting the network presence check acknowledge frame, the slave station transmits the link state checked before the network presence check acknowledge frame is transmitted while including the link state in the network presence check acknowledge frame, and
in the generating the network connection information, when the link states in the network presence check acknowledge frames received from all slave stations are normal, the communication management apparatus recognizes that the network has the ring configuration, wherein in the performing the transmission of the data frame, the slave station transmits the data frame while including, in the data frame, the link state checked before the data frame is transmitted, and
the data communication method further comprises:
the communication management apparatus transmitting, when a data frame, the link state of which is abnormal, from a communication node, the link state of which should be normal according to the network connection information is received during data frame transmission and reception, a first port control frame for disabling a port, the link state of which is abnormal, of the communication node that transmits the data frame;
the communication management apparatus performing switching of the ports of the own apparatus to generate network connection information for acquiring another communication node adjacent to an abnormal section; and
the communication management apparatus transmitting a second port control frame for disabling a port in an unconnected state of a communication node at an end in the network connection information generated after the performing the switching of the ports.

10. A data communication method for a plurality of communication nodes in a communication system including: a communication management apparatus including two ports that manages transmission of data in a token passing system in a network in which the communication nodes are connected via a transmission line in a ring shape and is one of the communication nodes; and a slave station that is another communication node in the network, the data communication method comprising:
the communication management apparatus transmitting, in broadcast, a network presence check frame for recognizing the communication node present in the network while including, in the frame, port information of a port from which the frame is transmitted;
the slave station transmitting, to the communication management apparatus, when the network presence check frame is received, a network presence check acknowledge frame including a relation between a communication node adjacent to the own station and ports of the communication node and repeating the received network presence check frame;
the communication management apparatus generating network connection information indicating a connection state between the communication nodes from the relation between the communication node adjacent to the slave station, which transmits the network presence check acknowledge frame, and the ports of the communication node included in the received network presence check acknowledge frame;
the communication management apparatus determining token circulation order based on the network connection information and notifying the slave station of token circulation destination information including a communication node to which a transmission right is granted next; and performing transmission of a data frame using the token frame, wherein
in the transmitting the network presence check frame, the communication management apparatus performs, before transmitting the network presence check frame, processing for changing any one of ports of the communication nodes on the network to a disabled state in which frame transmission and reception is impossible, wherein the communication method further comprises the slave station checking a link state that is normal in a state in which another communication node is communicably connected to a port of the own station and is abnormal in a state in which another communication node is not connected to the port of the own station, and wherein in the transmitting the network presence check acknowledge frame, the slave station transmits the link state checked before the network presence check acknowledge frame is transmitted while including the link state in the network presence check acknowledge frame, and in the generating the network connection information, when the link states in the network presence check acknowledge frames received from all slave stations are normal, the communication management apparatus recognizes that the network has the ring configuration, wherein in the performing the transmission of the data frame, when a state in which the data frame does not flow in the network for a predetermined time is detected, to generate new network connection information, the communication management apparatus performs processing from the transmitting the network presence check frame to the generating the network connection information, and the data communication method further comprises the communication management apparatus acquiring, from the new network connection information, a slave station at an end connected to the two ports and disabling an unconnected port of the slave station.

11. The data communication method according to claim 10, wherein, in the performing the transmission of the data frame, when the state in which the data frame does not flow in the network for the predetermined time occurs because of power-off of a slave station on the network, in the disabling the unconnected port, the communication managing apparatus disables a port of a slave station connected to the powered-off slave station via the transmission line.

12. The data communication method according to claim 10, wherein, in the performing the transmission of the data frame, when the state in which the data frame does not flow in the network for the predetermined time occurs because of breaking of wire of a transmission line on the network, in the disabling the unconnected port, the communication managing apparatus disables ports of slave stations connected to both ends of the broken transmission line.

13. A data communication method for a plurality of communication nodes in a communication system including: a communication management apparatus including two ports that manages transmission of data in a token passing system in a network in which the communication nodes are connected via a transmission line in a ring shape and is one of the communication nodes; and a slave station that is another communication node in the network, the data communication method comprising:

the communication management apparatus transmitting, in broadcast, a network presence check frame for recognizing the communication node present in the network while including, in the frame, port information of a port from which the frame is transmitted;

the slave station transmitting, to the communication management apparatus, when the network presence check frame is received, a network presence check acknowledge frame including a relation between a communication node adjacent to the own station and ports of the communication node and repeating the received network presence check frame;

the communication management apparatus generating network connection information indicating a connection state between the communication nodes from the relation between the communication node adjacent to the slave station, which transmits the network presence check acknowledge frame, and the ports of the communication node included in the received network presence check acknowledge frame;

the communication management apparatus determining token circulation order based on the network connection information and notifying the slave station of token circulation destination information including a communication node to which a transmission right is granted next; and performing transmission of a data frame using the token frame, wherein in the transmitting the network presence check frame, the communication management apparatus performs, before transmitting the network presence check frame, processing for changing any one of ports of the communication nodes on the network to a disabled state in which frame transmission and reception is impossible, wherein the communication method further comprises the slave station checking a link state that is normal in a state in which another communication node is communicably connected to a port of the own station and is abnormal in a state in which another communication node is not connected to the port of the own station, and wherein in the transmitting the network presence check acknowledge frame, the slave station transmits the link state checked before the network presence check acknowledge frame is transmitted while including the link state in the network presence check acknowledge frame, and in the generating the network connection information, when the link states in the network presence check acknowledge frames received from all slave stations are normal, the communication management apparatus recognizes that the network has the ring configuration, wherein in the performing the transmission of the data frame, the slave station transmits the data frame while including, in the data frame, the link state checked before the data frame is transmitted, and the data communication method further comprises:

the communication management apparatus transmitting, when a data frame, the link state of which is abnormal, from a communication node, the link state of which should be normal according to the network connection information is received during data frame transmission and reception, a first port control frame for enabling a port, the link state of which is normal, of the communication node that transmits the data frame; and the communication management apparatus performing switching of enabling and disabling of the ports of the communication nodes in the network using new network connection information generated after the transmitting the first port control frame.

14. The data communication method according to claim 13, wherein, in the generating the network connection information after the transmitting the first port control frame, when the network management apparatus recognizes from the new network connection information that the network has the ring configuration, in the performing the switching of the enabling and disabling of the ports, the communication management apparatus disables a port of the own apparatus from which the first port control frame is transmitted and transmits, to a communication node having a port disabled till then, a second port control frame for enabling the disabled port.

15. A data communication method for a plurality of communication nodes in a communication system including: a communication management apparatus including two ports that manages transmission of data in a token passing system in a network in which the communication nodes are connected via a transmission line in a ring shape and is one of the communication nodes; and a slave station that is another communication node in the network, the data communication method comprising:

the communication management apparatus transmitting, in broadcast, a network presence check frame for recognizing the communication node present in the network while including, in the frame, port information of a port from which the frame is transmitted;

the slave station transmitting, to the communication management apparatus, when the network presence check frame is received, a network presence check acknowledge frame including a relation between a communication node adjacent to the own station and ports of the communication node and repeating the received network presence check frame;

the communication management apparatus generating network connection information indicating a connection state between the communication nodes from the relation between the communication node adjacent to the slave station, which transmits the network presence check acknowledge frame, and the ports of the communication node included in the received network presence check acknowledge frame;

the communication management apparatus determining token circulation order based on the network connection information and notifying the slave station of token circulation destination information including a communication node to which a transmission right is granted next; and performing transmission of a data frame using the token frame, wherein in the transmitting the network presence check frame, the communication management apparatus performs, before transmitting the network presence check frame, processing for changing any one of ports of the communication nodes on the network to a disabled state in which frame transmission and reception is impossible, wherein the data communication method further comprises, monitoring a frame flowing in the network and monitoring a frame storm state in which a frame transmitted to the own apparatus is present even after the token frame disappears and time-out occurs or after the token frame is received; and the communication management apparatus stopping, when the frame storm state is detected in the monitoring the frame storm state, a repeat function for a frame between the two ports of the own apparatus.

* * * * *